(12) United States Patent
Tang

(10) Patent No.: US 10,438,320 B2
(45) Date of Patent: Oct. 8, 2019

(54) IMAGE PROCESSING METHOD AND APPARATUS, AND ELECTRONIC DEVICE

(71) Applicant: GUANGDONG OPPO MOBILE TELECOMMUNICATIONS CORP., LTD., Dongguan, Guangdong (CN)

(72) Inventor: Cheng Tang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/196,186

(22) Filed: Nov. 20, 2018

(65) Prior Publication Data

US 2019/0087934 A1 Mar. 21, 2019

Related U.S. Application Data

(63) Continuation of application No. 15/783,114, filed on Oct. 13, 2017, now Pat. No. 10,249,021.

(30) Foreign Application Priority Data

Nov. 29, 2016 (CN) .......................... 2016 1 1079541

(51) Int. Cl.
*H04N 7/01* (2006.01)
*G06T 3/40* (2006.01)
(Continued)

(52) U.S. Cl.
CPC .......... *G06T 3/4007* (2013.01); *G06T 3/0056* (2013.01); *G06T 3/4015* (2013.01);
(Continued)

(58) Field of Classification Search
CPC . G06T 7/11; G06T 7/90; G06T 3/4007; G06T 3/0056
See application file for complete search history.

(56) References Cited

U.S. PATENT DOCUMENTS 8,295,594 B2 * 10/2012 Brown Elliott .......... G09G 3/20
382/162
8,803,994 B2 8/2014 Imai
(Continued)

FOREIGN PATENT DOCUMENTS

CN 101815157 A 8/2010
CN 103531603 A 1/2014
(Continued)

OTHER PUBLICATIONS

PCT/CN2017/085408 International Search Report and Written Opinion dated Aug. 15, 2017, 12 pages.
(Continued)

*Primary Examiner* — Gregory M Desire
(74) *Attorney, Agent, or Firm* — Lathrop Gage LLP

(57) ABSTRACT

An image processing method is provided. The method is configured to process the color-block image output by the image sensor. The face region of the color-block image is determined. A part of the color-block image beyond the face region is converted into a first simulation image using a first interpolation algorithm. A part of the color-block image within the face region is converted into a second simulation image using a second interpolation algorithm. The complexity of the second interpolation algorithm is less than that of the first interpolation algorithm. The first simulation image and the second simulation image are merged into a simulation image corresponding to the color-block image. An image processing apparatus and an electronic device are provided. With the image processing method, the image processing apparatus and the electronic device, distinguishability and resolution of the image are improved, and time required for processing the image is reduced.

20 Claims, 17 Drawing Sheets

(51) Int. Cl.

| | | |
|---|---|---|
| *G06T 7/11* | (2017.01) | |
| *G06T 7/90* | (2017.01) | |
| *G06T 5/00* | (2006.01) | |
| *H04N 9/04* | (2006.01) | |
| *H04N 5/347* | (2011.01) | |
| *H04N 5/3745* | (2011.01) | |
| *G06T 3/00* | (2006.01) | |
| *G06T 5/50* | (2006.01) | |

(52) U.S. Cl.
CPC .............. *G06T 5/002* (2013.01); *G06T 5/003* (2013.01); *G06T 5/50* (2013.01); *G06T 7/11* (2017.01); *G06T 7/90* (2017.01); *H04N 5/347* (2013.01); *H04N 5/37457* (2013.01); *H04N 9/045* (2013.01); *G06T 2207/10024* (2013.01); *G06T 2207/20* (2013.01); *G06T 2207/20221* (2013.01); *H04N 2209/046* (2013.01)

(56) References Cited

U.S. PATENT DOCUMENTS

| | | | |
|---|---|---|---|
| 8,810,697 | B2 | 8/2014 | Kawai |
| 8,817,141 | B2 | 8/2014 | Tanaka |
| 9,111,365 | B2 | 8/2015 | Park et al. |
| 9,240,033 | B2 | 1/2016 | Li et al. |
| 9,344,639 | B2 | 5/2016 | Musatenko et al. |
| 9,432,643 | B2 | 8/2016 | Hayashi et al. |
| 9,888,198 | B2 | 2/2018 | Mauritzson et al. |
| 9,959,672 | B2 * | 5/2018 | Goel .................... G06T 17/205 |
| 9,965,865 | B1 * | 5/2018 | Agrawal ................ G06T 7/194 |
| 9,979,883 | B2 | 5/2018 | Lei |
| 9,998,690 | B2 | 6/2018 | Ajito |
| 10,110,809 | B2 | 10/2018 | Tang |
| 2003/0086009 | A1 | 5/2003 | Yeh |
| 2005/0068455 | A1 | 3/2005 | Hatano |
| 2007/0181687 | A1 | 8/2007 | Fukushima et al. |
| 2008/0062290 | A1 | 3/2008 | Lahav et al. |
| 2008/0170808 | A1 | 7/2008 | Nakagata |
| 2008/0193049 | A1 | 8/2008 | Onomura |
| 2008/0316346 | A1 | 12/2008 | Watanabe |
| 2010/0020210 | A1 | 1/2010 | Tsunekawa |
| 2010/0053356 | A1 | 3/2010 | Tsunekawa |
| 2010/0157113 | A1 | 6/2010 | Kobayashi |
| 2011/0052095 | A1 | 3/2011 | Deever |
| 2012/0127334 | A1 | 5/2012 | Imai |
| 2012/0147205 | A1 | 6/2012 | Lelescu |
| 2013/0051665 | A1 | 2/2013 | Shinozaki |
| 2013/0083220 | A1 | 4/2013 | Imade |
| 2013/0258145 | A1 | 10/2013 | Nakaseko |
| 2013/0315506 | A1 | 11/2013 | Moriya |
| 2014/0078346 | A1 | 3/2014 | Imade |
| 2014/0152865 | A1 | 6/2014 | Ogino |
| 2014/0153823 | A1 | 6/2014 | Lee |
| 2014/0192250 | A1 | 7/2014 | Mitsunaga |
| 2014/0223849 | A1 * | 8/2014 | Mularoni ................ E04F 15/08 52/403.1 |
| 2014/0267351 | A1 | 9/2014 | Klaus |
| 2014/0270518 | A1 | 9/2014 | Yano |
| 2014/0340565 | A1 | 11/2014 | Kitani |
| 2015/0093039 | A1 | 4/2015 | Li |
| 2015/0172615 | A1 | 6/2015 | Tanaka |
| 2015/0312537 | A1 | 10/2015 | Solhusvik et al. |
| 2016/0014354 | A1 | 1/2016 | Fukuda |
| 2016/0050354 | A1 | 2/2016 | Musatenko |
| 2016/0247262 | A1 | 8/2016 | Li |
| 2016/0373649 | A1 | 12/2016 | Honda |
| 2017/0180681 | A1 | 6/2017 | Okita |
| 2017/0223250 | A1 | 8/2017 | Ajito |
| 2017/0359559 | A1 | 12/2017 | Patel |
| 2018/0184066 | A1 * | 6/2018 | Salahieh ............... H04N 13/395 |

FOREIGN PATENT DOCUMENTS

| | | |
|---|---|---|
| CN | 104168403 A | 11/2014 |
| CN | 105578067 A | 5/2016 |
| CN | 105611123 A | 5/2016 |
| CN | 105611124 A | 5/2016 |
| CN | 105611258 A | 5/2016 |
| CN | 106357967 A | 1/2017 |
| CN | 106454289 A | 2/2017 |
| CN | 106504218 A | 3/2017 |
| CN | 106507019 A | 3/2017 |
| CN | 106604001 A | 4/2017 |
| WO | WO 2016122896 A1 | 8/2016 |

OTHER PUBLICATIONS

European Patent Application No. 17198762.1 extended Search and Opinion dated Mar. 29, 2018, 8 pages.
Chinese Patent Application No. 201611079541.3 First Office Action dated Jan. 11, 2018, 6 pages.
Chinese Patent Application No. 201611079541.3 English Translation of First Office Action dated Jan. 11, 2018, 6 pages.
Chinese Patent Application No. 201611079541.3 First Search, Dec. 8, 2017, 1 page.
Chinese Patent Application No. 201611079541.3 Supplementary Search, Feb. 9, 2018, 1 page.
Chinese Patent Application No. 201611079541.3 Notification to Grant Patent Right for Invention dated Mar. 22, 2018, 1 page.
Chinese Patent Application No. 201611079541.3 English translation of Notification to Grant Patent Right for Invention dated Mar. 22, 2018, 2 pages.
Chinese Patent Application No. 201611079541.3 Allowed claims as of Mar. 22, 2018, 3 pages.
Chinese Patent Application No. 201611079541.3 English translation of Allowed claims as of Mar. 22, 2018, 5 pages.
U.S. Appl. No. 15/783,114, Notice of Allowance dated Jan. 23, 2019, 20 pages.

* cited by examiner

Merged image

|  R  |  R  | Gr  | Gr  |
|-----|-----|-----|-----|
|  R  |  R  | Gr  | Gr  |
| Gb  | Gb  |  B  |  B  |
| Gb  | Gb  |  B  |  B  | color-block image

Fig. 8

IMAGE PROCESSING METHOD AND APPARATUS, AND ELECTRONIC DEVICE

CROSS-REFERENCE TO RELATED APPLICATIONS

This application is a continuation application of a U.S. patent application Ser. No. 15/783,114, filed Oct. 13, 2017, which claims priority to Chinese Patent Application No. 201611079541.3, filed Nov. 29, 2016, each of which is incorporated by reference in its entirety.

FIELD

The present disclosure relates to the imaging technology field, and more particularly to an image processing method, an image processing apparatus and an electronic device.

BACKGROUND

When an image is processed using a conventional image processing method, either the obtained image has a low resolution, or it takes a long time and too much resource to obtain an image with high resolution, both of which are inconvenient for users.

DISCLOSURE

The present disclosure aims to solve at least one of existing problems in the related art to at least extent. Accordingly, the present disclosure provides an image processing method, an image processing apparatus and an electronic device.

Embodiments of the present disclosure provide an image processing method. The image processing method is configured to process a color-block image output by an image sensor. The image sensor includes an array of photosensitive pixel units and an array of filter units arranged on the array of photosensitive pixel units. Each filter unit corresponds to one photosensitive pixel unit, and each photosensitive pixel unit includes a plurality of photosensitive pixels. The color-block image includes image pixel units arranged in a preset array, and each image pixel unit includes a plurality of original pixels. Each photosensitive pixel unit corresponds to one image pixel unit, and each photosensitive pixel corresponds to one original pixel. The image processing method includes: identifying a face region of the color-block image; converting a part of the color-block image beyond the face region into a first simulation image using a first interpolation algorithm, in which, the first simulation image includes first simulation pixels arranged in a preset array, and each photosensitive pixel corresponds to one first simulation pixel; converting a part of the color-block image within the face region into a second simulation image using a second interpolation algorithm, in which, the second simulation image includes second simulation pixels arranged in a preset array, and each photosensitive pixel corresponds to one second simulation pixel, and a complexity of the second interpolation algorithm is less than that of the first interpolation algorithm; and merging the first simulation image and the second simulation image into a simulation image corresponding to the color-block image.

Embodiments of the present disclosure further provide an image processing apparatus. The image processing apparatus is configured to process a color-block image output by an image sensor. The image sensor includes an array of photosensitive pixel units and an array of filter units arranged on the array of photosensitive pixel units. Each filter unit corresponds to one photosensitive pixel unit, and each photosensitive pixel unit includes a plurality of photosensitive pixels. The color-block image includes image pixel units arranged in a preset array, and each image pixel unit includes a plurality of original pixels. Each photosensitive pixel unit corresponds to one image pixel unit, and each photosensitive pixel corresponds to one original pixel. The image processing apparatus includes a non-transitory computer-readable medium including computer-readable instructions stored thereon, and an instruction execution system which is configured by the instructions to implement at least one of an identifying module, a first converting module, a second converting module and a merging module. The identifying module is configured to identify a face region of the color-block image. The first converting module is configured to convert a part of the color-block image beyond the face region into a first simulation image using a first interpolation algorithm, in which, the first simulation image includes first simulation pixels arranged in a preset array and each photosensitive pixel corresponds to one first simulation pixel. The second converting module is configured to convert a part of the color-block image within the face region into a second simulation image using a second interpolation algorithm, in which, the second simulation image includes second simulation pixels arranged in a preset array, and each photosensitive pixel corresponds to one second simulation pixel, and a complexity of the second interpolation algorithm is less than that of the first interpolation algorithm. The merging module is configured to merge the first simulation image and the second simulation image into a simulation image corresponding to the color-block image.

Embodiments of the present disclosure provide an electronic device. The electronic device includes a housing, a processor, a memory, a circuit board, a power supply circuit and an imaging apparatus. The circuit board is enclosed by the housing. The processor and the memory are positioned on the circuit board. The power supply circuit is configured to provide power for respective circuits or components of the electronic device. The imaging apparatus includes an image sensor configured to output a color-block image. The image sensor includes an array of photosensitive pixel units and an array of filter units arranged on the array of photosensitive pixel units. Each filter unit corresponds to one photosensitive pixel unit, and each photosensitive pixel unit includes a plurality of photosensitive pixels. The color-block image includes image pixel units arranged in a preset array. Each image pixel unit includes a plurality of original pixels. Each photosensitive pixel unit corresponds to one image pixel unit, and each photosensitive pixel corresponds to one original pixel. The memory is configured to store executable program codes. The processor is configured to run a program corresponding to the executable program codes by reading the executable program codes stored in the memory, to perform the image processing method according to the above embodiments of the present disclosure.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings.

FIG. 8 is a schematic diagram of a color-block image according to an embodiment of the present disclosure.

EMBODIMENTS OF THE PRESENT DISCLOSURE

Figure 1:
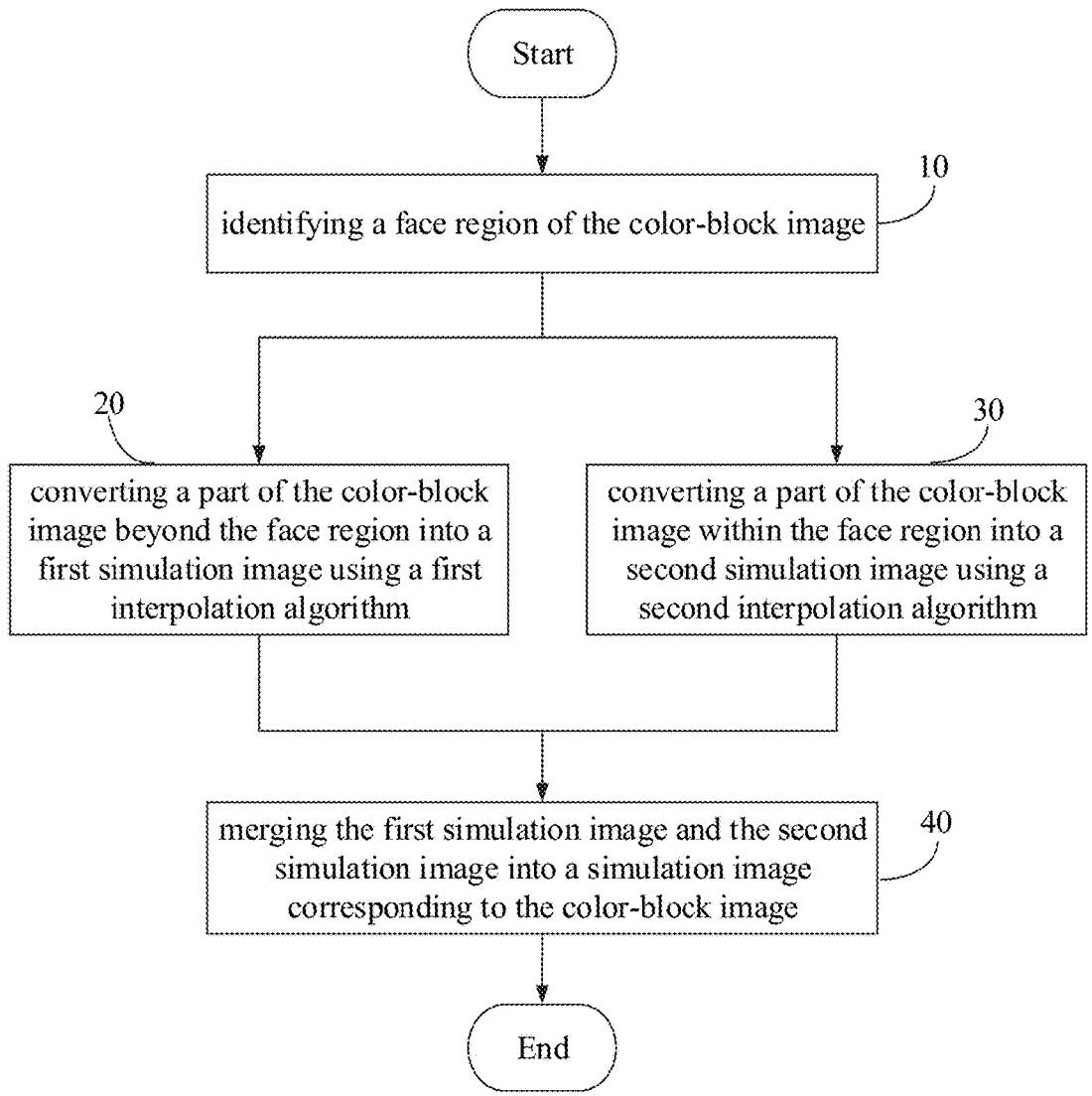
FIG. 1 is a flow chart of an image processing method according to an embodiment of the present disclosure.

Reference will now be made in detail to exemplary embodiments, examples of which are illustrated in the accompanying drawings, in which the same or similar reference numbers throughout the drawings represent the same or similar elements or elements having same or similar functions. Embodiments described below with reference to drawings are merely exemplary and used for explaining the present disclosure, and should not be understood as limitation to the present disclosure.

It is to be understood that phraseology and terminology used herein with reference to device or element orientation (such as, terms like "center", "longitudinal", "lateral", "length", "width", "height", "up", "down", "front", "rear", "left", "right", "vertical", "horizontal", "top", "bottom", "inside", "outside", "clockwise", "anticlockwise", "axial", "radial", "circumferential") are only used to simplify description of the present invention, and do not indicate or imply that the device or element referred to must have or operated in a particular orientation. They cannot be seen as limits to the present disclosure.

Moreover, terms of "first" and "second" are only used for description and cannot be seen as indicating or implying relative importance or indicating or implying the number of the indicated technical features. Thus, the features defined with "first" and "second" may comprise or imply at least one of these features. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements or interactions of two elements, which can be understood by those skilled in the art according to specific situations.

In the present disclosure, unless specified or limited otherwise, a structure in which a first feature is "on" a second feature may include an embodiment in which the first feature directly contacts the second feature, and may also include an embodiment in which the first feature indirectly contacts the second feature via an intermediate medium. Moreover, a structure in which a first feature is "on", "over" or "above" a second feature may indicate that the first feature is right above the second feature or obliquely above the second feature, or just indicate that a horizontal level of the first feature is higher than the second feature. A structure in which a first feature is "below", or "under" a second feature may indicate that the first feature is right under the second feature or obliquely under the second feature, or just indicate that a horizontal level of the first feature is lower than the second feature.

Various embodiments and examples are provided in the following description to implement different structures of the present disclosure. In order to simplify the present disclosure, certain elements and settings will be described. However, these elements and settings are only examples and are not intended to limit the present disclosure. In addition, reference numerals may be repeated in different examples in the disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

In the related art, an image sensor includes an array of photosensitive pixel units and an array of filter units arranged on the array of photosensitive pixel unit. Each filter unit corresponds to and covers one photosensitive pixel unit, and each photosensitive pixel unit includes a plurality of photosensitive pixels. When working, the image sensor may be controlled to output a merged image, which can be converted into a merged true-color image by an image processing method and saved. The merged image includes an array of merged pixels, and a plurality of photosensitive pixels in a same photosensitive pixel unit are collectively outputted as one merged pixel. Thus, a signal-to-noise ratio of the merge image is increased. However, a resolution of the merged image is reduced.

Certainly, the image sensor also can be controlled to output a color-block image with more number of pixels. The color-block image includes an array of original pixels, and each photosensitive pixel corresponds to one original pixel. However, since a plurality of original pixels corresponding to a same filter unit have the same color, the resolution of the color-block image still cannot be increased. Thus, the color-block image needs to be converted into a high pixel simulation image by an interpolation algorithm, in which the simulation image may include simulation pixels arranged in a Bayer array. Then, the simulation image can be converted into a simulation true-color image by an image processing method and saved. The resolution of the true-color image may be improved by using the interpolation algorithm. However, the interpolation algorithm consumes resource and time, and the simulation true-color image is not required in all scenes.

Thus, embodiments of the present disclosure provide a novel image processing method.

Figure 2:
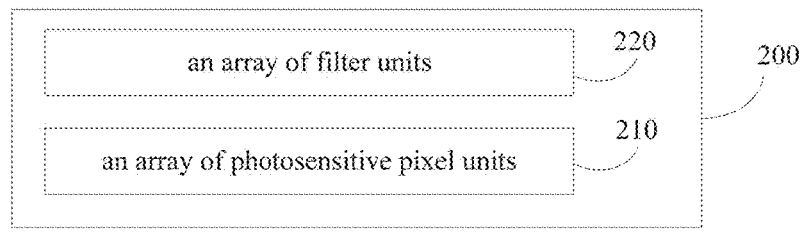
FIG. 2 is a block diagram of an image sensor according to an embodiment of the present disclosure.
Figure 3:
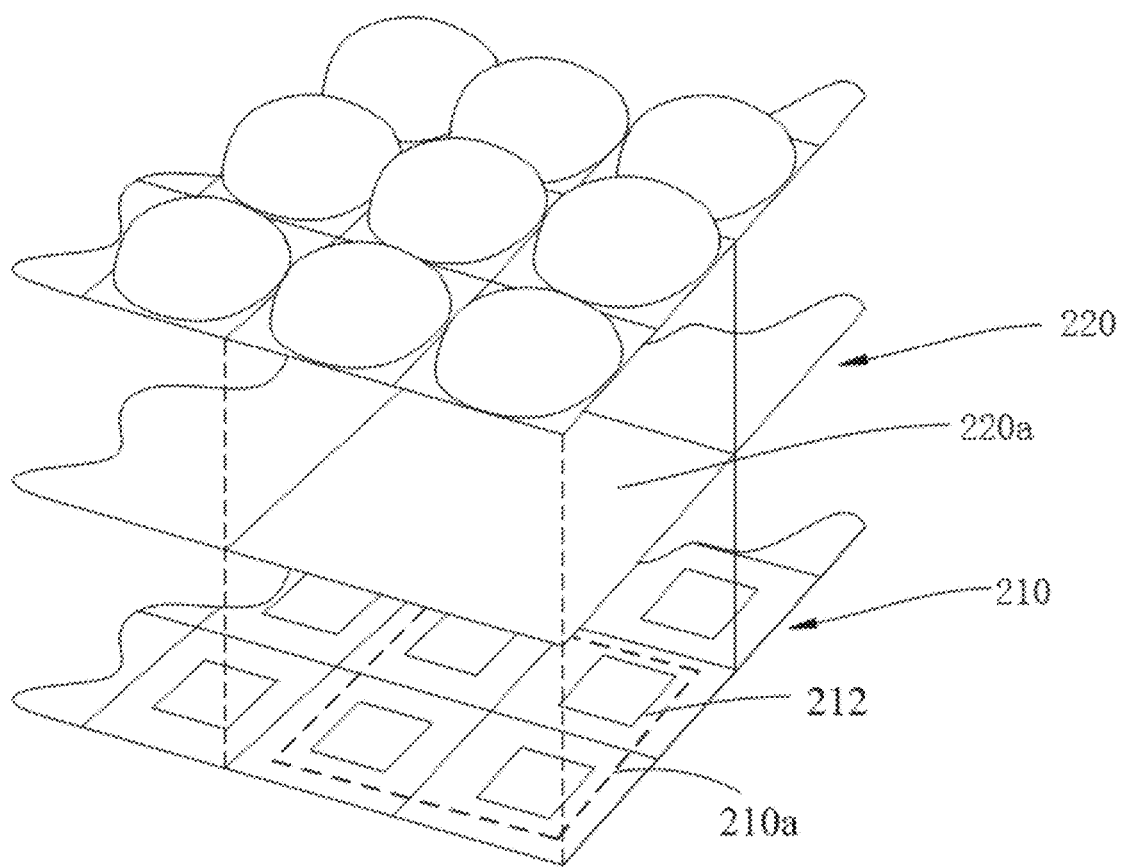
FIG. 3 is a schematic diagram of an image sensor according to an embodiment of the present disclosure.

Referring to FIG. 1, an image processing method is illustrated. The image processing method is configured to process a color-block image output by an image sensor. As illustrated in FIG. 2, the image sensor 200 includes an array 210 of photosensitive pixel units and an array 220 of filter units arranged on the array 210 of photosensitive pixel units. As illustrated in FIG. 3, the array 220 includes a plurality of filter units 220*a*, and the array 210 includes a plurality of photosensitive pixel units 210*a*. Each filter unit 220*a* corresponds to and covers one photosensitive pixel unit 210*a*, and each photosensitive pixel unit 210*a* includes a plurality of photosensitive pixels 212 adjacent to each other. The color-block image includes image pixel units arranged in a preset array. Each image pixel unit includes a plurality of original pixels. Each photosensitive pixel unit 210*a* corresponds to one image pixel unit, and each photosensitive pixel 212 corresponds to one original pixel. The image processing method includes the following.

At block 10, a face region of the color-block image is identified.

At block 20, a part of the color-block image beyond the face region is converted into a first simulation image using a first interpolation algorithm.

The first simulation image includes first simulation pixels arranged in a preset array, and each photosensitive pixel 212 corresponds to one first simulation pixel.

At block 30, a part of the color-block image within the face region is converted into a second simulation image using a second interpolation algorithm.

The second simulation image includes second simulation pixels arranged in a preset array, and each photosensitive pixel 212 corresponds to one second simulation pixel. A complexity of the second interpolation algorithm is less than that of the first interpolation algorithm.

At block 40, the first simulation image and the second simulation image are merged into a simulation image corresponding to the color-block image.

With the image processing method according to embodiments of the present disclosure, the image sensor 200 can be controlled to output a suitable image by identifying the face region. In this way, the part of the color-block image beyond the face region is processed with the first interpolation algorithm capable of improving distinguishability and resolution of the image, thereby improving the distinguishability and resolution of the image, while the part of the color-block image within the face region is processed with the second interpolation algorithm having a less complexity than the first interpolation algorithm, such that SNR (signal to noise ratio), the resolution and the distinguishability of the image are improved, meanwhile data and time for image processing is reduced, thereby improving the user experience.

In some implementations, the algorithm complexity includes the time complexity and the space complexity, and both the time complexity and the space complexity of the second interpolation algorithm are less than those of the first interpolation algorithm. The time complexity is configured to measure a time consumed by the algorithm, and the space complexity is configured to measure a storage space consumed by the algorithm. If the time complexity is small, it indicates that the algorithm consumes little time. If the space complexity is small, it indicates that the algorithm consumes little storage space. Thus, it is advantageous to improve calculation speed by using the second interpolation algorithm, such that the shooting process is smooth, thus improving the user experience. In an example, the act at block 120 may be implemented by inputting the color-block image to a face identification algorithm library to detect whether there is a face in the color-block image. The face detecting method may be implemented by performing the following. Feature data of the color-block image is extracted. Feature models stored in the library are searched for based on the extracted feature data. A threshold is set to determine that there is a face in the color-block image when a similarity between the feature data and the feature model exceeds the threshold. Coordinate ranges of the face are transmitted back to execute follow-up blocks.

Figure 4:
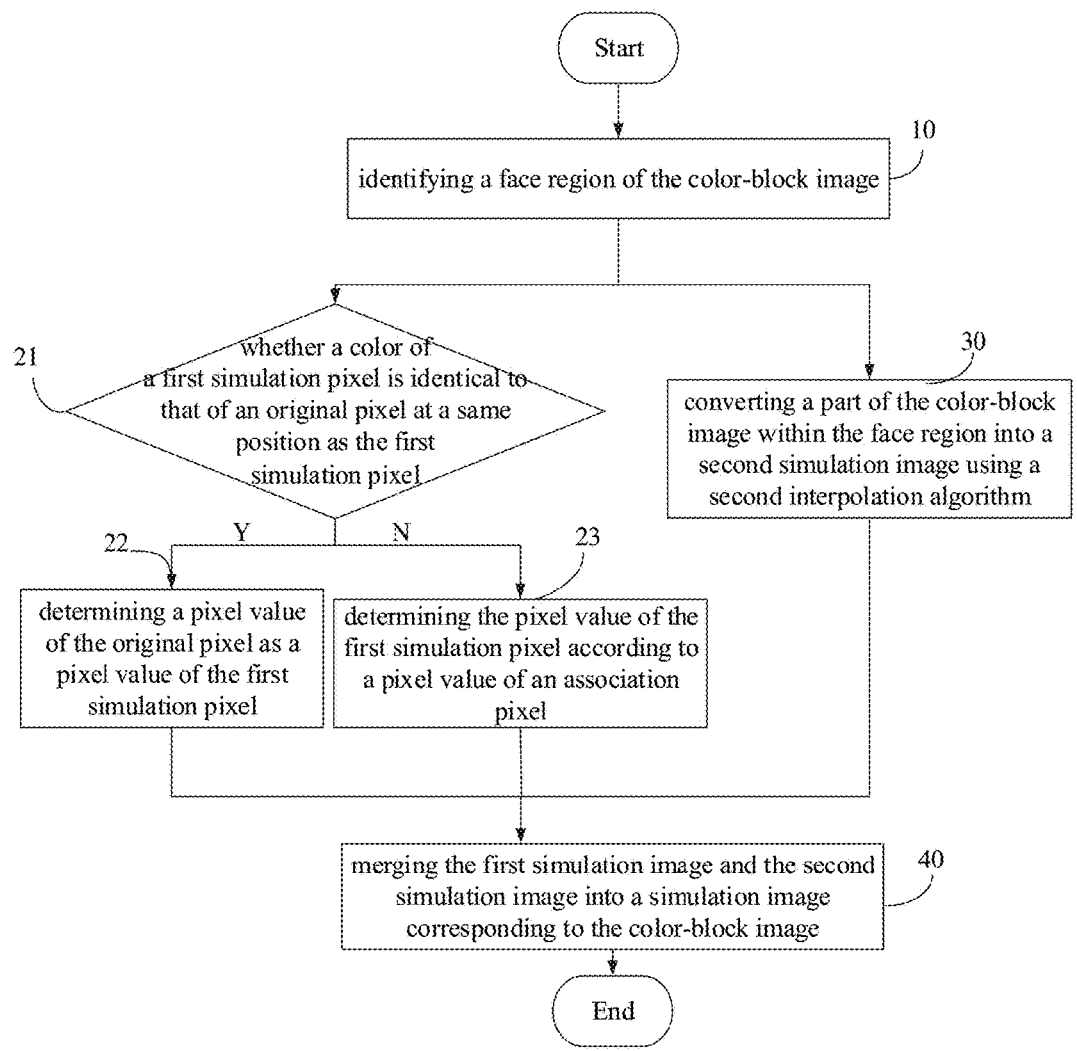
FIG. 4 is a flow chart of an image processing method according to another embodiment of the present disclosure.

Referring to FIG. 4, in some implementations, the act at block 20 includes the following.

At block 21, it is determined whether a color of a first simulation pixel is identical to that of an original pixel at a same position as the first simulation pixel, if yes, an act at block 22 is executed, otherwise, an act at block 23 is executed.

At block 22, a pixel value of the original pixel is determined as a pixel value of the first simulation pixel.

At block 23, the pixel value of the first simulation pixel is determined according to a pixel value of an association pixel.

The association pixel is selected from an image pixel unit with a same color as the first simulation pixel and adjacent to an image pixel unit including the original pixel.

Figure 5:
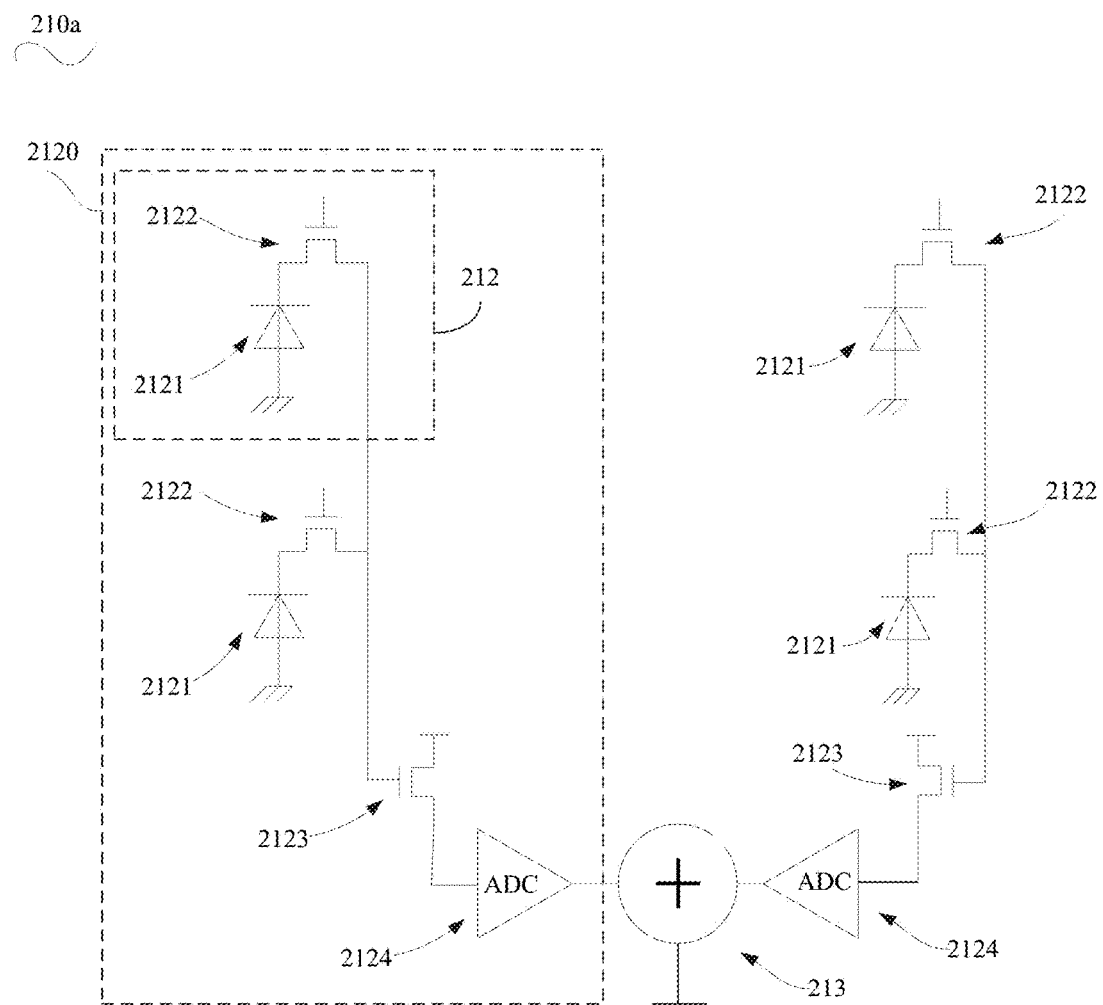
FIG. 5 is a schematic diagram illustrating a circuit of an image sensor according to an embodiment of the present disclosure.
Figure 6:
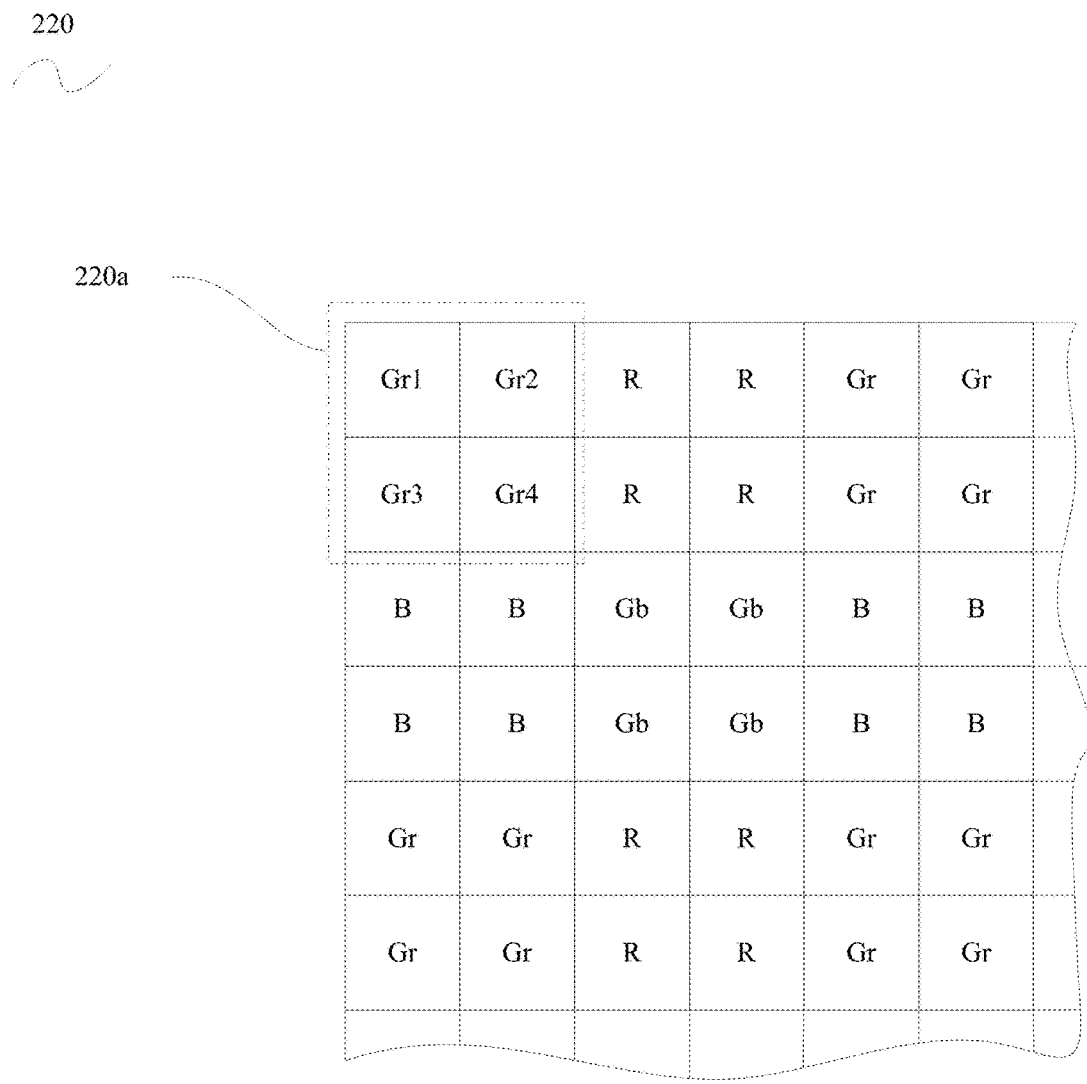
FIG. 6 is a schematic diagram of an array of filter units according to an embodiment of the present disclosure.

FIG. 5 is a schematic diagram illustrating a circuit of an image sensor according to an embodiment of the present disclosure. FIG. 6 is a schematic diagram of an array of filter units according to an embodiment of the present disclosure. FIGS. 2-3 and 5-6 are best viewed together.

Referring to FIGS. 2-3 and 5-6, the image sensor 200 according to an embodiment of the present disclosure includes an array 210 of photosensitive pixel units and an array 220 of filter units arranged on the array 210 of photosensitive pixel units.

Further, the array 210 of photosensitive pixel units includes a plurality of photosensitive pixel units 210*a*. Each photosensitive pixel unit 210*a* includes a plurality of adjacent photosensitive pixels 212. Each photosensitive pixel 212 includes a photosensitive element 2121 and a transmission tube 2122. The photosensitive element 2121 may be a photodiode, and the transmission tube 2122 may be a MOS transistor.

The array 220 of filter units includes a plurality of filter units 220a. Each filter unit 220a corresponds to one photosensitive pixel unit 210a.

In detail, in some examples, the filter units 220a are arranged in a Bayer array. In other words, four adjacent filter units 220a include one red filter unit, one blue filter unit and two green filter units.

Each photosensitive pixel unit 210a corresponds to a filter unit 220a with a same color. If a photosensitive pixel unit 210a includes n adjacent photosensitive elements 2121, one filter unit 220a covers n photosensitive elements 2121 in one photosensitive pixel unit 210a. The filter unit 220a may be formed integrally, or may be formed by assembling n separate sub filters.

In some implementations, each photosensitive pixel unit 210a includes four adjacent photosensitive pixels 212. Two adjacent photosensitive pixels 212 collectively form one photosensitive pixel subunit 2120. The photosensitive pixel subunit 2120 further includes a source follower 2123 and an analog-to-digital converter 2124. The photosensitive pixel unit 210a further includes an adder 213. A first electrode of each transmission tube 2122 in the photosensitive pixel subunit 2120 is coupled to a cathode electrode of a corresponding photosensitive element 2121. Second electrodes of all the transmission tubes 2122 in the photosensitive pixel subunit 2120 are collectively coupled to a gate electrode of the source follower 2123 and coupled to an analog-to-digital converter 2124 through the source electrode of the source follower 2123. The source follower 2123 may be a MOS transistor. Two photosensitive pixel subunits 2120 are coupled to the adder 213 through respective source followers 2123 and respective analog-to-digital converters 2124.

In other words, four adjacent photosensitive elements 2121 in one photosensitive pixel unit 210a of the image sensor 200 according to an embodiment of the present disclosure collectively use one filter unit 220a with a same color as the photosensitive pixel unit 210a. Each photosensitive element 2121 is coupled to a transmission tube 2122 correspondingly. Two adjacent photosensitive elements 2121 collectively use one source follower 2123 and one analog-digital converter 2124. Four adjacent photosensitive elements 2121 collectively use one adder 213.

Further, four adjacent photosensitive elements 2121 are arranged in a 2-by-2 array. Two photosensitive elements 2121 in one photosensitive pixel subunit 2120 can be in a same row.

During an imaging process, when two photosensitive pixel subunits 2120 or four photosensitive elements 2121 covered by a same filter unit 220a are exposed simultaneously, pixels can be merged, and the merged image can be outputted.

In detail, the photosensitive element 2121 is configured to convert light into charge, and the charge is proportional to an illumination intensity. The transmission tube 2122 is configured to control a circuit to turn on or off according to a control signal. When the circuit is turned on, the source follower 2123 is configured to convert the charge generated through light illumination into a voltage signal. The analog-to-digital converter 2124 is configured to convert the voltage signal into a digital signal. The adder 213 is configured to add two digital signals to output.

Figure 7:
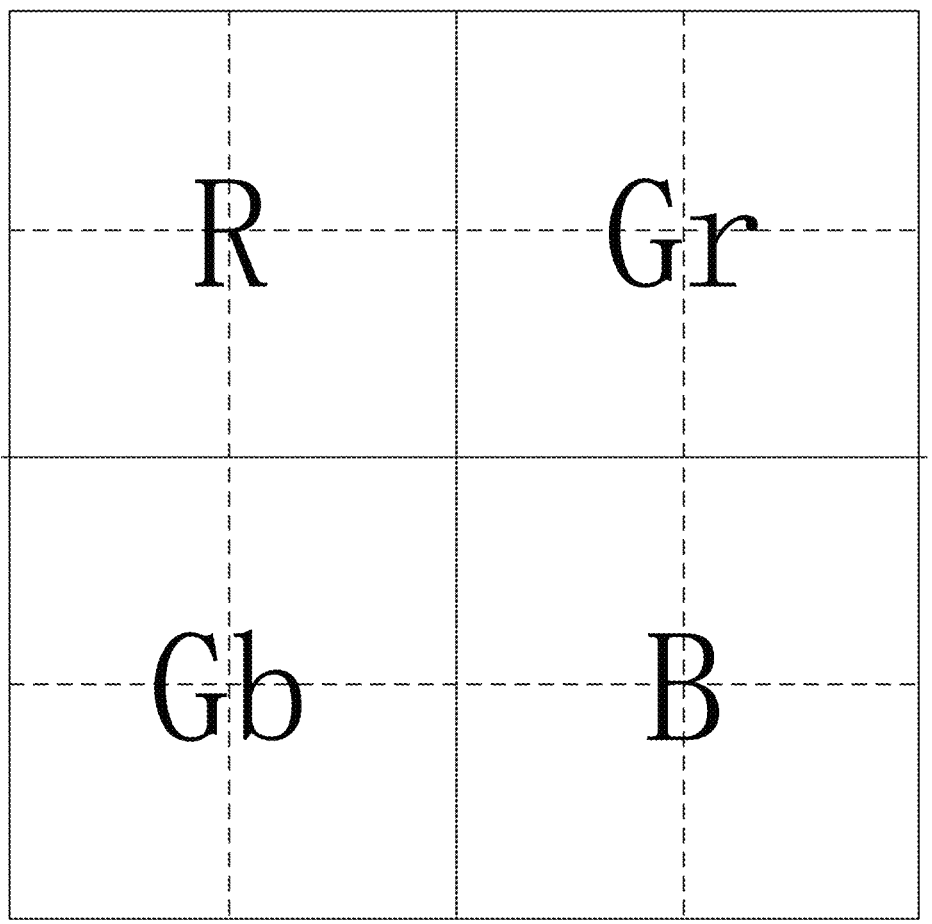
FIG. 7 is a schematic diagram of a merged image according to an embodiment of the present disclosure.

Referring to FIG. 7, take an image sensor 200 of 16M as an example. The image sensor 200 according to an embodiment of the present disclosure can merge photosensitive pixels 212 of 16M into photosensitive pixels of 4M, i.e., the image sensor 200 outputs the merged image. After the merging, the photosensitive pixel 212 quadruples in size, such that the photo-sensibility of the photosensitive pixel 212 is increased. In addition, since most part of noise in the image sensor 200 is random, there may be noise points at one or two pixels before the merging. After four photosensitive pixels 212 are merged into a big photosensitive pixel 212, an effect of noise points on the big photosensitive pixel is reduced, i.e., the noise is weakened and SNR (signal to noise ratio) is improved.

However, when the size of the photosensitive pixel is increased, the number of pixels is decreased, and thus the resolution of the merged image is decreased.

During an imaging process, when four photosensitive elements 2121 covered by a same filter unit 220a are exposed to light in sequence, a color-block image may be output after an image processing.

In detail, the photosensitive element 2121 is configured to convert light into charge, and the charge is proportional to an illumination intensity. The transmission tube 2122 is configured to control a circuit to turn on or off according to a control signal. When the circuit is turned on, the source follower 2123 is configured to convert the charge generated by the photosensitive element 2121 under light illumination into a voltage signal. The analog-to-digital converter 2124 is configured to convert the voltage signal into a digital signal for being processed.

Referring to FIG. 8, take an image sensor 200 of 16M as an example. The image sensor 200 according to an embodiment of the present disclosure can output photosensitive pixels 212 of 16M, i.e., the image sensor 200 outputs the color-block image. The color-block image includes image pixel units. The image pixel unit includes original pixels arranged in a 2-by-2 array. The size of the original pixel is the same as that of the photosensitive pixel 212. However, since filter unit 220a covering four adjacent photosensitive elements 2121 has a same color (i.e., although four photosensitive elements 2121 are exposed to light respectively, the filter unit 220a covers the four photosensitive elements 2121 has a same color), four adjacent original pixels in each image pixel unit of the output image have a same color, and thus the resolution of the image cannot be increased.

The image processing method according to an embodiment of the present disclosure is able to process the output color-block image to obtain a simulation image.

In some embodiments, when a merged image is output, four adjacent photosensitive pixels 212 with the same color can be output as one merged pixel. Accordingly, four adjacent merged pixels in the merged image can be considered as being arranged in a typical Bayer array, and can be processed directly to output a merged true-color image. When a color-block image is output, each photosensitive pixel 212 is output separately. Since four adjacent photosensitive pixels 212 have a same color, four adjacent original pixels in an image pixel unit have a same color, which form an untypical Bayer array. However, the pixels with the untypical Bayer array cannot be directly processed. In other words, when the image sensor 200 adopts a same apparatus for processing the image, in order to realize a compatibility of the true-color image outputs under two modes (i.e., the merged true-color image under a merged mode and the simulation true-color image under a color-block mode), it is required to convert the color-block image into the simulation image, or to convert the image pixel unit in an untypical Bayer array into pixels arranged in the typical Bayer array.

The simulation image includes simulation pixels arranged in the Bayer array. Each photosensitive pixel corresponds to one simulation pixel. One simulation pixel in the simulation image corresponds to an original pixel located at the same position as the simulation pixel and in the color-block image. According to embodiments of the present disclosure, the simulation image is merged by the first simulation image and the second simulation image.

By using the first interpolation algorithm, the part of the color-block image beyond the face region can be converted into the simulation first image. The first simulation image includes first simulation pixels arranged in an array and each photosensitive pixel corresponds to one first simulation pixel.

Figure 9:
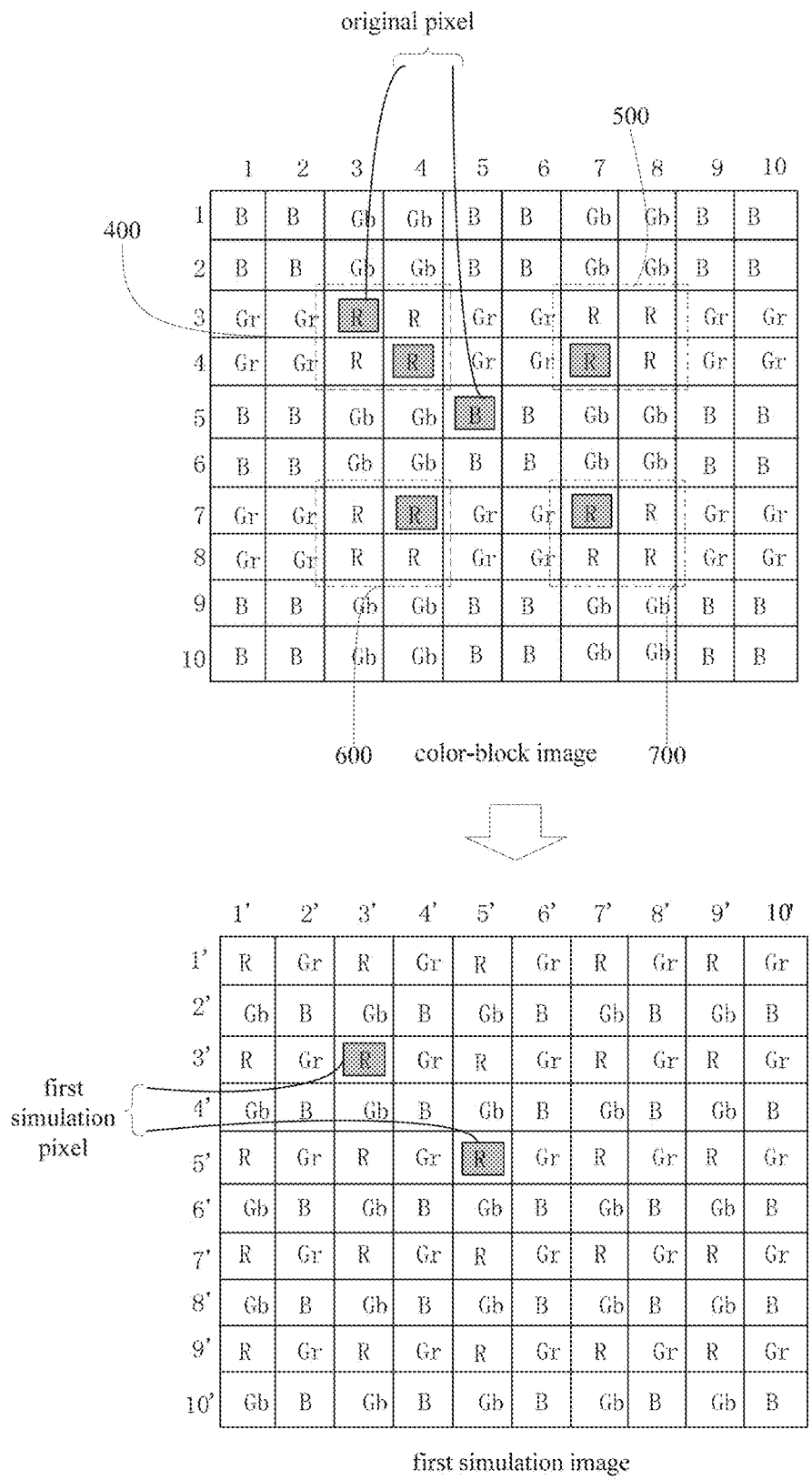
FIG. 9 is a schematic diagram illustrating a process of converting a part of a color-block image into a first simulation image according to an embodiment of the present disclosure.

FIG. 9 is a schematic diagram illustrating a process of converting a part of a color-block image into a first simulation image according to an embodiment of the present disclosure.

Referring to FIG. 9, the first interpolation algorithm is illustrated. For the first simulation pixels R3'3' and R5'5', the corresponding original pixels are R33 and B55.

When the first simulation pixel R3'3' is obtained, since the first simulation pixel R3'3' has the same color as the corresponding original pixel R33, the pixel value of the original pixel R33 is directly determined as the pixel value of the first simulation pixel R3'3' during conversion.

When the first simulation pixel R5'5' is obtained, since the first simulation pixel R5'5' has a color different from that of the corresponding original pixel B55, the pixel value of the original pixel B55 cannot be directly determined as the pixel value of the first simulation pixel R5'5', and it is required to calculate the pixel value of the first simulation pixel R5'5' according to an association pixel of the first simulation pixel R5'5' by a first interpolation algorithm.

It should be noted that, a pixel value of a pixel mentioned in the context should be understood in a broad sense as a color attribute value of the pixel, such as a color value. There may be more than one association pixel unit for each first simulation pixel, for example, there may be four association pixel units, in which the association pixel units have the same color as the first simulation pixel and are adjacent to the image pixel unit including the original pixel at the same position as the first simulation pixel.

It should be noted that, "adjacent" here should be understood in a broad sense. Take FIG. 9 as an example, the first simulation pixel R5'5' corresponds to the original pixel B55. The image pixel units 400, 500, 600 and 700 are selected as the association pixel units, but other red image pixel units far away from the image pixel unit where the original pixel B55 is located are not selected as the association pixel units. In each association pixel unit, the red original pixel closest to the original pixel B55 is selected as the association pixel, which means that the association pixels of the first simulation pixel R5'5' include the original pixels R44, R74, R47 and R77. The first simulation pixel R5'5' is adjacent to and has the same color as the original pixels R44, R74, R47 and R77.

In different cases, the original pixels can be converted into the first simulation pixels in different ways, thus converting the color-block image into the first image. Since the filters in the Bayer array are adopted when shooting the image, the SNR of the image is improved. During the image processing procedure, the interpolation processing is performed on the part of the color-block image beyond the face region by the first interpolation algorithm, such that the distinguishability and resolution of the image can be improved.

Figure 10:
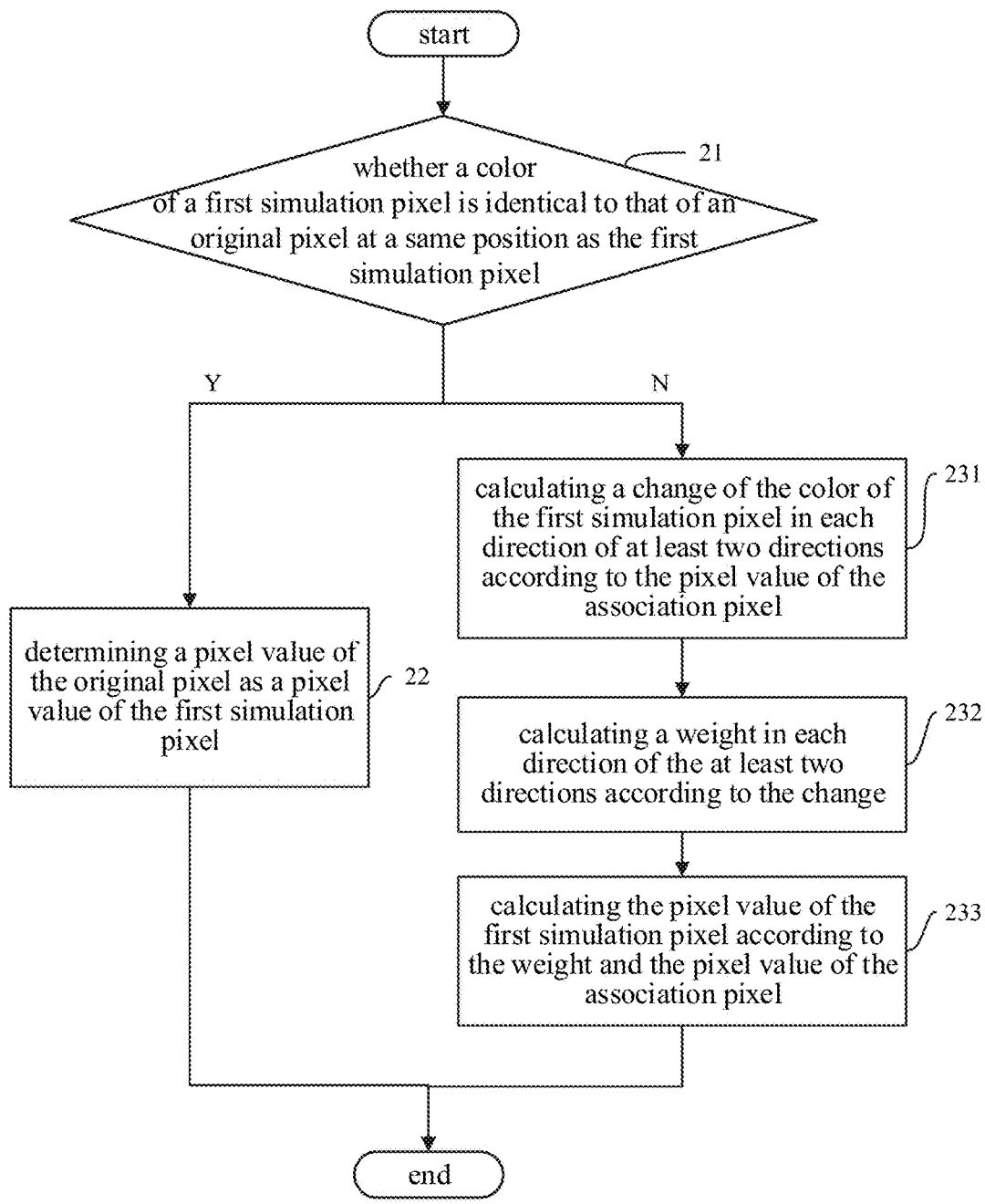
FIG. 10 is a flow chart of a process of converting a part of a color-block image into a first simulation image according to an embodiment of the present disclosure.

Referring to FIG. 10, in some implementations, the act at block 23 (i.e., determining the pixel value of the first simulation pixel according to a pixel value of an association pixel) includes the following.

At block 231, a change of the color of the first simulation pixel in each direction of at least two directions is calculated according to the pixel value of the association pixel. At block 232, a weight in each direction of the at least two directions is calculated according to the change.

At block 233, the pixel value of the first simulation pixel is calculated according to the weight and the pixel value of the association pixel.

In detail, the first interpolation processing is realized as follows: with reference to energy changes of the image in different directions and according to weights of the association pixels in different directions, the pixel value of the first simulation pixel is calculated by a linear interpolation. From the direction having a smaller energy change, it can get a higher reference value, i.e., the weight for this direction in the first interpolation is high.

In some examples, for sake of convenience, only the horizontal direction and the vertical direction are considered.

The pixel value of the first simulation pixel R5'5' is obtained by a first interpolation algorithm based on the original pixels R44, R74, R47 and R77. Since there is no original pixel with a same color as the first simulation pixel (i.e., R) in the horizontal direction and the vertical direction of the original pixel R55 corresponding the first simulation pixel R5'5', a component of this color (i.e., R) in each of the horizontal direction and the vertical direction is calculated according to the association pixels. The components in the horizontal direction are R45 and R75, and the components in the vertical direction are R54 and R57. All the components can be calculated according to the original pixels R44, R74, R47 and R77.

In detail, R45=R44*2/3+R47*1/3, R75=2/3*R74+1/3*R77, R54=2/3*R44+1/3*R74, R57=2/3*R47+1/3*R77.

The change of color and the weight in each of the horizontal direction and the vertical direction are calculated respectively. In other words, according to the change of color in each direction, the reference weight in each direction used in the first interpolation algorithm is determined. The weight in the direction with a small change is high, while the weight in the direction with a big change is low. The change in the horizontal direction is X1=|R45−R75|. The change in the vertical direction is X2=|R54−R57|, W1=X1/(X1+X2), W2=X2/(X1+X2).

After the above calculation, the pixel value of the first simulation pixel R5'5' can be calculated as R5'5'=(2/3*R45+1/3*R75)*W2+(2/3*R54+1/3*R57)*W1. It can be understood that, if X1>X2, then W1>W2. The weight in the horizontal direction is W2, and the weight in the vertical direction is W1, vice versa.

Accordingly, the pixel value of the first simulation pixel can be calculated by the first interpolation algorithm. After the calculations on the association pixels, the original pixels can be converted into the first simulation pixels arranged in the typical Bayer array. In other words, four adjacent first simulation pixels arranged in the 2-by-2 array include one red first simulation pixel, two green first simulation pixels and one blue first simulation pixel.

It should be noted that, the first interpolation processing is not limited to the above-mentioned method, in which only the pixel values of pixels with a same color as the first simulation pixel in the vertical direction and the horizontal direction are considered during calculating the pixel value of the first simulation pixel. In other embodiments, pixel values of pixels with other colors can also be considered.

Figure 11:
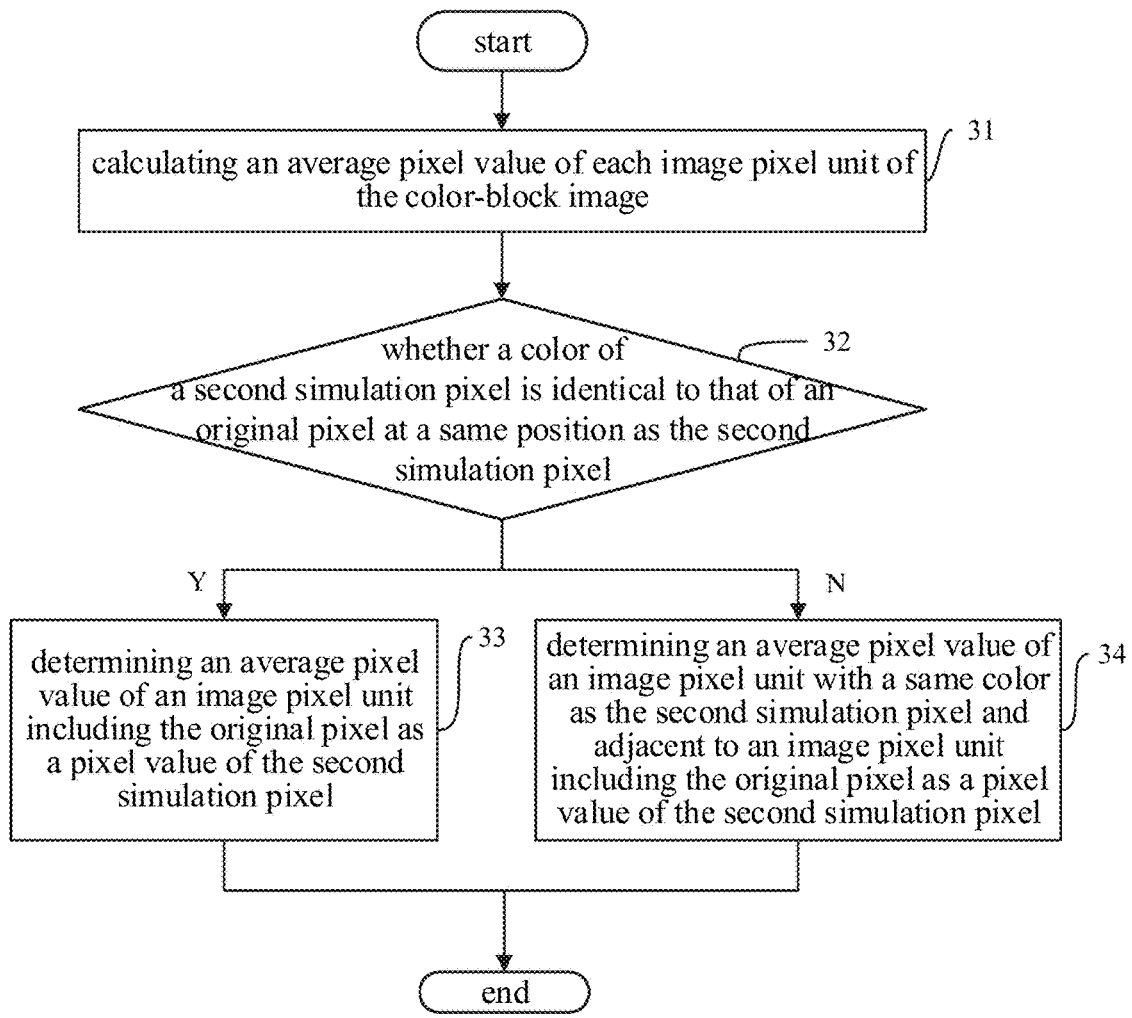
FIG. 11 is a flow chart of a process of converting a part of a color-block image into a second image according to an embodiment of the present disclosure.

FIG. 11 is a flow chart of a process of converting a part of a color-block image into a second image according to an embodiment of the present disclosure.

Referring to FIG. 11, in some embodiments, the act at block 30 includes the following.

At block 31, an average pixel value of each image pixel unit of the part of the color-block image within the face region is calculated.

At block 32, it is determined whether a color of a second simulation pixel is identical to that of an original pixel at a same position as the second simulation pixel, if yes, an act at block 33 is executed, otherwise, an act at block 34 is executed.

At block 33, an average pixel value of an image pixel unit including the original pixel is determined as a pixel value of the second simulation pixel; and At block 34, an average pixel value of an image pixel unit with a same color as the second simulation pixel and adjacent to an image pixel unit including the original pixel is determined as a pixel value of the second simulation pixel.

For the part of the color-block image within the face region, the color-block is required to be processed using the second interpolation algorithm. The second interpolation algorithm may be implemented as follows. The average pixel value of the original pixels included in one image pixel unit of the part is calculated. It is determined whether the color of the second simulation pixel is identical to that of the original pixel at the same position as the second simulation pixel. When the two colors are same, the average pixel value corresponding to the original pixel is determined as the pixel value of the second simulation pixel. If the two colors are different from each other, the pixel value of the second simulation pixel is determined according to the pixel value of an associated pixel having the same color with the second simulation pixel and adjacent to the image pixel unit including the original pixel.

Figure 12:
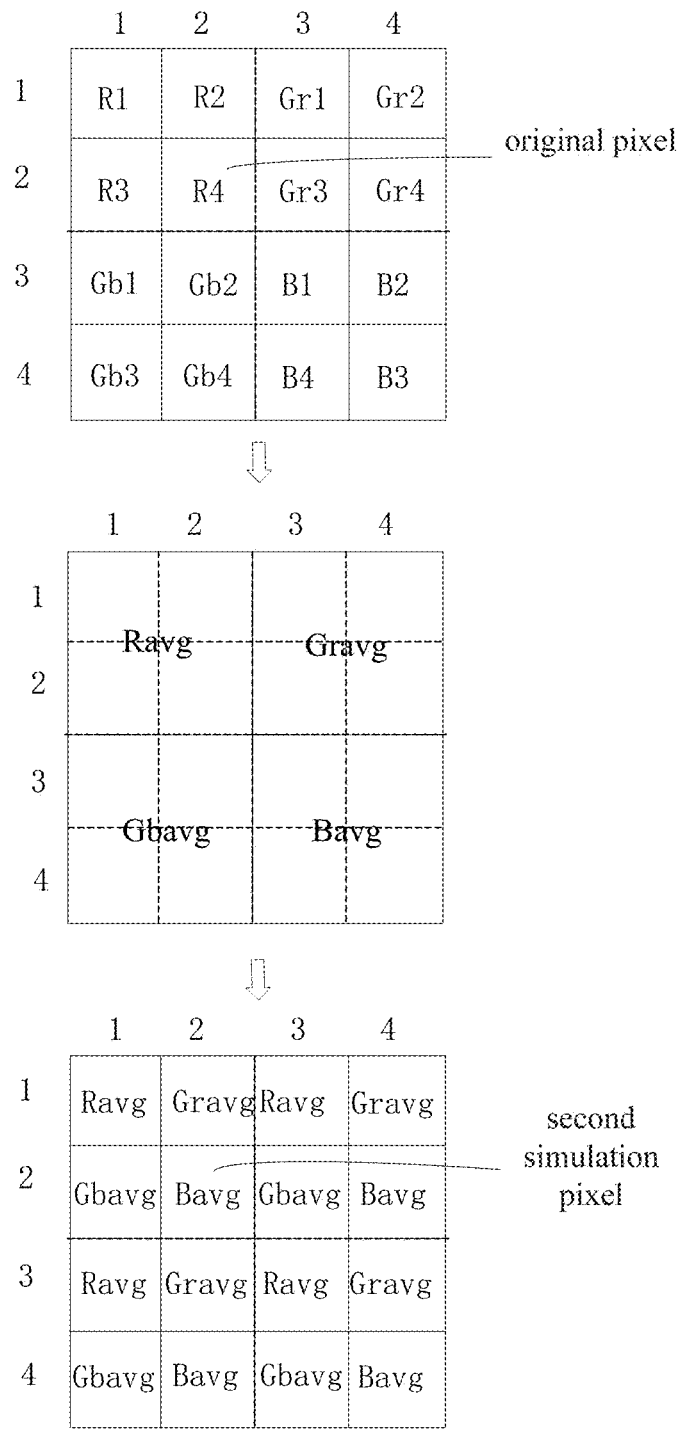
FIG. 12 is a schematic diagram illustrating a process of converting a part of a color-block image into a second simulation image according to an embodiment of the present disclosure.

Referring to FIG. 12, an average pixel value of each image pixel unit is calculated as Ravg=(R1+R2+R3+R4)/4, Gravg=(Gr1+Gr2+Gr3+Gr4)/4, Gbavg=(Gb1+Gb2+Gb3+Gb4)/4 and Bavg=(B1+B2+B3+B4)/4. The pixel values of the original pixels R11, R12, R13 and R14 all equal to Ravg. The pixel values of the original pixels Gr31, Gr32, Gr41 and Gr42 all equal to Gravg. The pixel values of the original pixels Gb13, Gb14, Gb23 and Gb24 all equal to Gbave. The pixel values of the original pixels B33, B34, B43 and B44 all equal to Bavg. The second simulation pixel B22 is taken as an example, the corresponding original pixel having the same position as the second simulation pixel B22 is R22. Since the color of the second simulation pixel B22 is different from the corresponding original pixel R22, the average pixel value Bavg of the image pixel unit (including the original pixels B33, B34, B43 and B44) with the same color (blue) as B22 and adjacent to the image pixel unit including B22 is determined as the pixel value of B22. Similarly, the pixel value of each second simulation pixel with other colors can be determined using the second interpolation algorithm.

By using the second interpolation algorithm, the complexity of converting the color-block image in the untypical Bayer array into the second simulation image in the typical array is relatively lower than the first interpolation algorithm. With the second interpolation algorithm, the distinguishability of the second simulation image may be also increased than the color-block image, but the effect of the second simulation image is less than the first simulation image obtained with the first interpolation algorithm. Therefore, the part of the color-block image beyond the face region is processed using the first interpolation algorithm and the part of the color-block image within the face region is processed using the second interpolation algorithm, the distinguishability and effect of the simulation image may be increased, thereby improving the user experience and reducing the time taken by the image processing.

Figure 13:
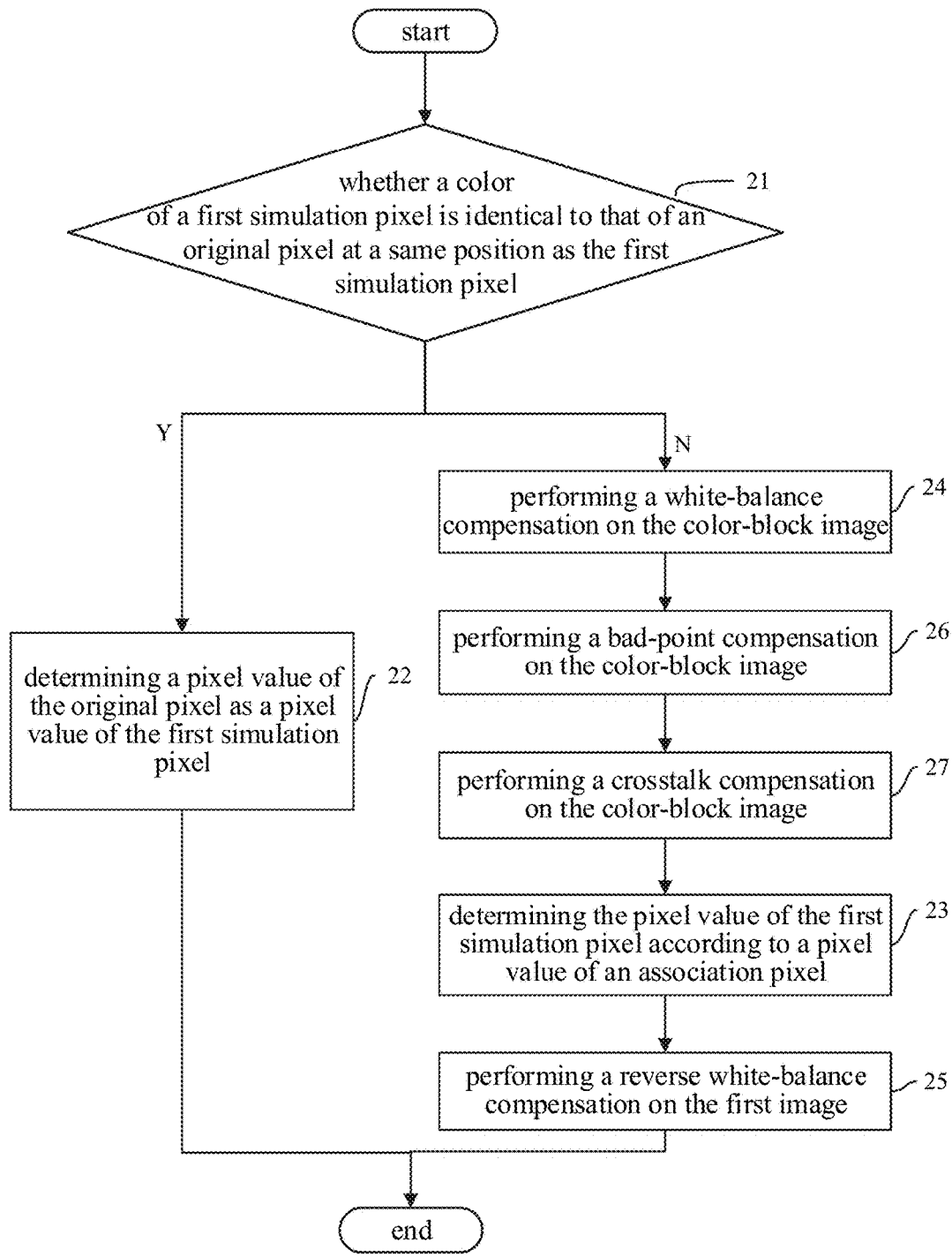
FIG. 13 is a flow chart of a process of converting a part of a color-block image into a first simulation image according to an embodiment of the present disclosure.

Referring to FIG. 13, in some embodiments, before the act at block 23, the method further includes performing a white-balance compensation on the color-block image, as illustrated at block 24.

Accordingly, after the act at block 23, the method further includes performing a reverse white-balance compensation on the first simulation image, as illustrated at block 25.

In detail, in some examples, when converting the color-block image into the first simulation image in the first interpolation algorithm, the red and blue first simulation pixels not only refer to the color weights of original pixels having the same color as the first simulation pixels, but also refer to the color weights of original pixels with the green color. Thus, it is required to perform the white-balance compensation before the interpolation to exclude an effect of the white-balance in the first interpolation calculation. In order to avoid damaging the white-balance of the color-block image, it is required to perform the reverse white-balance compensation on the first simulation image after the first interpolation according to gain values of the red, green and blue colors in the compensation.

In this way, the effect of the white-balance in the interpolation calculation can be excluded, and the simulation image obtained after the interpolation can keep the white-balance of the color-block image.

Referring to FIG. 13 again, in some implementations, before the act at block 23, the method further includes performing a bad-point compensation on the color-block image, as illustrated at block 26.

It can be understood that, limited by the manufacturing process, there may be bad points in the image sensor 200. The bad point presents a same color all the time without varying with the photo-sensibility, which affects quality of the image. In order to ensure an accuracy of the interpolation and prevent from the effect of the bad points, it is required to perform the bad-point compensation before the interpolation.

In detail, during the bad-point compensation, the original pixels are detected. When an original pixel is detected as the bad point, the bad-point compensation is performed according to pixel values of other original pixels in the image pixel unit where the original pixel is located.

In this way, the effect of the bad point on the interpolation can be avoided, thus improving the quality of the image.

Referring to FIG. 13 again, in some implementations, before the act at block 23, the method includes performing a crosstalk compensation on the color-block image, as illustrated at block 27.

In detail, four photosensitive pixels 212 in one photosensitive pixel unit 210a are covered by the filters with the same color, and the photosensitive pixels 212 have different photo-sensibilities, such that fixed spectrum noise may occur in pure-color areas in the simulation true-color image outputted after converting the simulation image and the quality of the image may be affected. Therefore, it is required to perform the crosstalk compensation on the color-block image.

As described above, in order to perform the crosstalk compensation, it is required to obtain the compensation parameters during the manufacturing process of the image sensor 200 of an imaging apparatus, and to store the parameters related to the crosstalk compensation into the storage of the imaging apparatus or the electronic device provided with the imaging apparatus, such as the mobile phone or tablet computer The preset luminous environment, for example, may include an LED uniform plate having a color temperature of about 5000K and a brightness of about 1000 lux. The imaging parameters may include a gain value, a shutter value and a location of a lens.

After setting the related parameters, the crosstalk compensation parameters can be obtained.

During the process, multiple color-block images are obtained using the preset imaging parameters in the preset luminous environment, and combined into one combination color-block image, such that the effect of noise caused by using a single color-block image as reference can be reduced.

Figure 14:
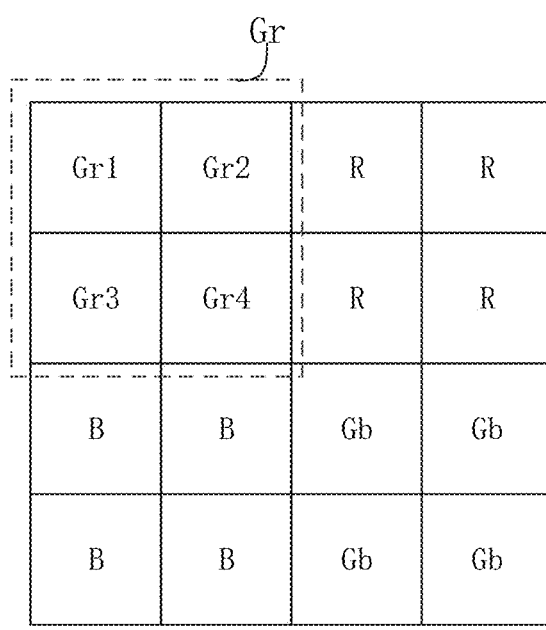
FIG. 14 is a schematic diagram showing an image pixel unit of a color-block image according to an embodiment of the present disclosure.

Referring to FIG. 14, take the image pixel unit Gr as an example. The image pixel unit Gr includes original pixels Gr1, Gr2, Gr3 and Gr4. The purpose of the crosstalk compensation is to adjust the photosensitive pixels which may have different photo-sensibilities to have the same photo-sensibility. An average pixel value of the image pixel unit is Gr_avg=(Gr1+Gr2+Gr3+Gr4)/4, which represents an average level of photo-sensibilities of the four photosensitive pixels. By configuring the average value as a reference value, ratios of Gr1/Gr_avg, Gr2/Gr_avg, Gr3/Gr_avg and Gr4/Gr_avg are calculated. It can be understood that, by calculating a ratio of the pixel value of each original pixel to the average pixel value of the image pixel unit, a deviation between each original pixel and the reference value can be reflected. Four ratios can be recorded in a storage of a related device as the compensation parameters, and can be retrieved during the imaging process to compensate for each original pixel, thus reducing the crosstalk and improving the quality of the image.

Generally, after setting the crosstalk compensation parameters, verification is performed on the parameters to determine the accuracy of the parameters.

During the verification, a color-block image is obtained with the same luminous environment and same imaging parameters as the preset luminous environment and the preset imaging parameters, and the crosstalk compensation is performed on the color-block image according to the calculated compensation parameters to calculate compensated Gr'_avg, Gr'1/Gr'_avg, Gr'2/Gr'_avg, Gr'3/Gr'_avg and Gr'4/Gr'_avg. The accuracy of parameters can be determined according to the calculation results from a macro perspective and a micro perspective. From the micro perspective, when a certain original pixel after the compensation still has a big deviation which is easy to be sensed by the user after the imaging process, it means that the parameters are not accurate. From the macro perspective, when there are too many original pixels with deviations after the compensation, the deviations as a whole can be sensed by the user even if a single original pixel has a small deviation, and in this case, the parameters are also not accurate. Thus, a ratio threshold can be set for the micro perspective, and another ratio threshold and a number threshold can be set for the macro perspective. In this way, the verification can be performed on the crosstalk compensation parameters to ensure the accuracy of the compensation parameters and to reduce the effect of the crosstalk on the quality of the image.

Figure 15:
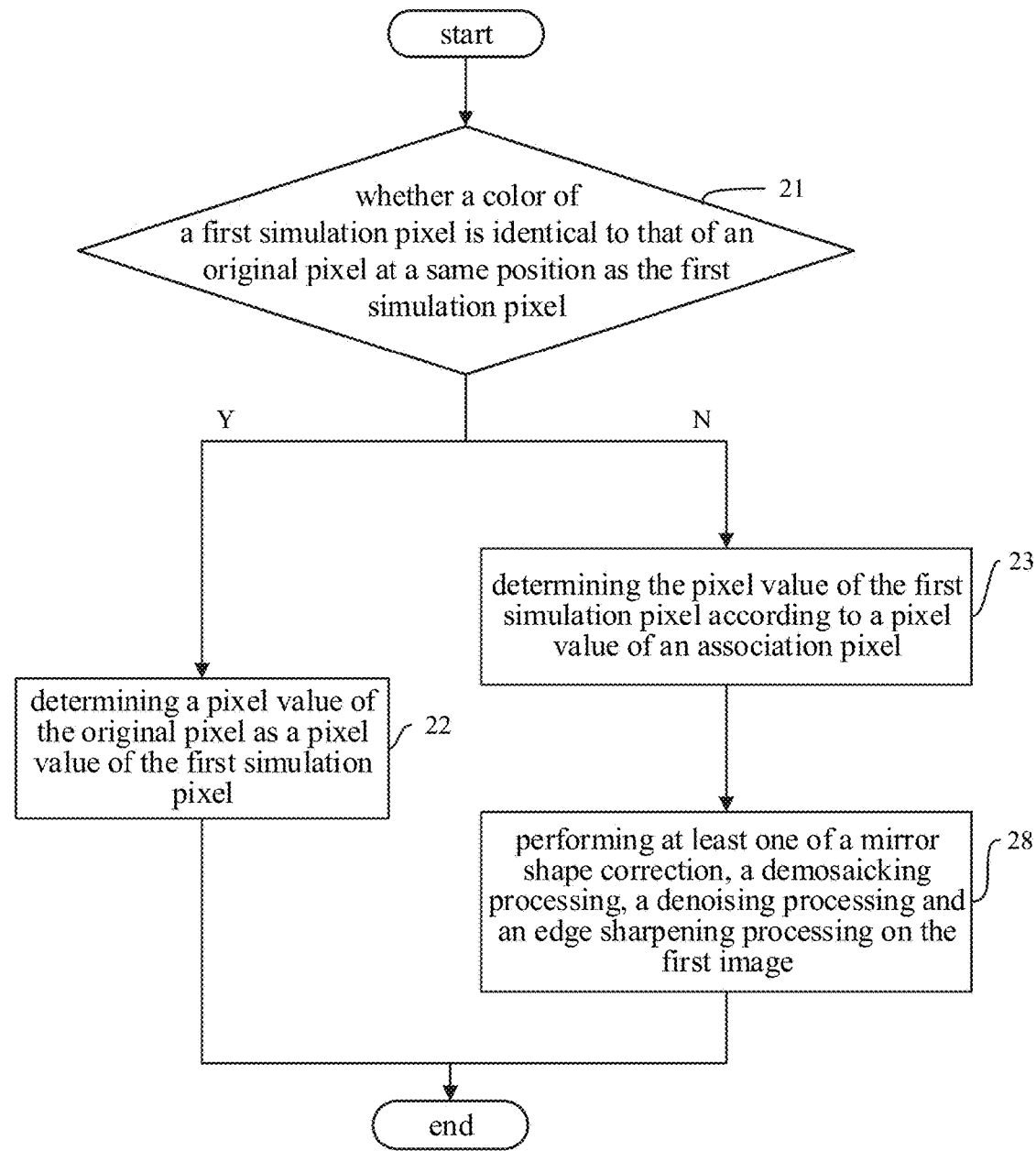
FIG. 15 is a flow chart of a process of converting a part of a color-block image into a first simulation image according to an embodiment of the present disclosure.

Referring to FIG. 15, in some implementations, after the act at block 23, the method further includes performing at least one of a mirror shape correction, a demosaicking processing, a denoising processing and an edge sharpening processing on the first simulation image, as illustrated at block 28.

It can be understood that, after the color-block image is converted into the first simulation image, the first simulation pixels are arranged in the typical Bayer array. The first simulation image can be processed, during which, the mirror shape correction, the demosaicking processing, the denoising processing and the edge sharpening processing are included.

In another aspect, the present disclosure also provides an image processing apparatus.

Figure 16:
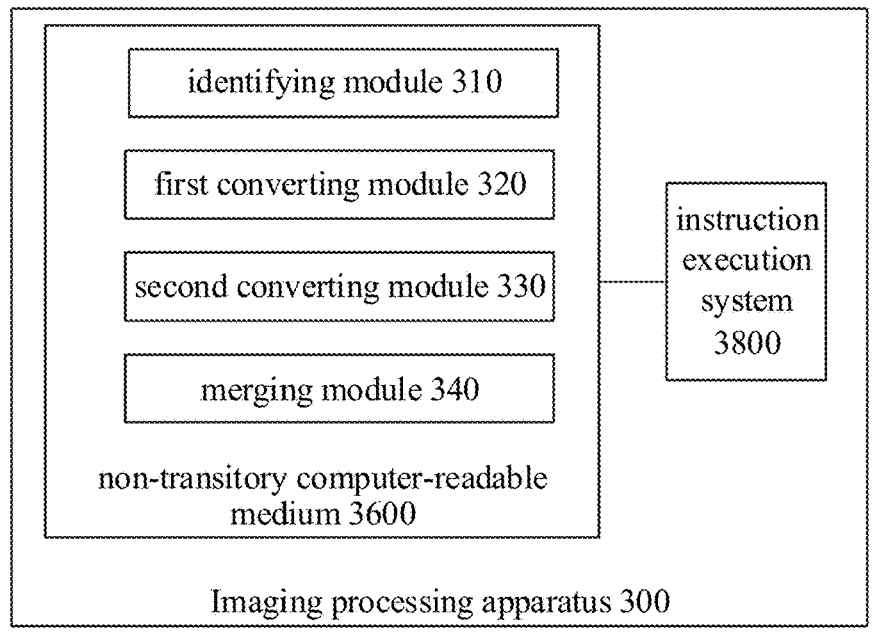
FIG. 16 is a block diagram of an image processing apparatus according to an embodiment of the present disclosure.

FIG. 16 is a block diagram of an image processing apparatus according to an embodiment of the present disclosure. Referring to FIG. 16 and FIGS. 2-3, and 5-6, an image processing apparatus 300 is illustrated. The image processing apparatus 300 is configured to process a color-block image output by an image sensor 200. As illustrated above, the image sensor 200 includes an array 210 of photosensitive pixel units and an array 220 of filter units arranged on the array 210 of photosensitive pixel units. Each filter unit 220a corresponds to one photosensitive pixel unit 210a, and each photosensitive pixel unit 210a includes a plurality of photosensitive pixels 212. The color-block image includes image pixel units arranged in a preset array. Each image pixel unit includes a plurality of original pixels. Each photosensitive pixel unit 210a corresponds to one image pixel unit, and each photosensitive pixel 212 corresponds to one original pixel. The image processing apparatus 300 includes a non-transitory computer-readable medium 3600 and an instruction execution system 3800. The non-transitory computer-readable medium 3600 includes computer-executable instructions stored thereon. As illustrated in FIG. 16, the non-transitory computer-readable medium 3600 includes a plurality of program modules, including an identifying module 310, a first converting module 320, a second converting module 330, and a merging module 340. The instruction execution system 3800 is configured by the instructions stored in the medium 3600 to implement the program modules.

The identifying module 310 is configured to identify a face region of the color-block image. The first converting module 320 is configured to convert a part of the color-block image beyond the face region into a first simulation image using a first interpolation algorithm. The first simulation image includes first simulation pixels arranged in a preset array and each photosensitive pixel 212 corresponds to one first simulation pixel. The second converting module 330 is configured to convert a part of the color-block image within the face region into a second simulation image using a second interpolation algorithm. The second simulation image includes second simulation pixels arranged in a preset array, and each photosensitive pixel 212 corresponds to one second simulation pixel. A complexity of the second interpolation algorithm is less than that of the first interpolation algorithm. The merging module 340 is configured to merge the first simulation image and the second simulation image into a simulation image corresponding to the color-block image.

In other words, the act at block 10 can be implemented by the identifying module 310. The act at block 20 can be implemented by the first converting module 320. The act at block 30 can be implemented by the second converting module 330. The act at block 40 can be implemented by the merging module 340.

With the image processing apparatus according to embodiments of the present disclosure, the image sensor 200 can be controlled to output a suitable image by identifying the face region. In this way, the part of the color-block image beyond the face region is processed with the first interpolation algorithm capable of improving distinguishability and resolution of the image, thereby improving the distinguishability and resolution of the image, while the part of the color-block image within the face region is processed with the second interpolation algorithm having a less complexity than the first interpolation algorithm, such that SNR (signal to noise ratio), the resolution and the distinguishability of the image are improved, meanwhile data and time for image processing is reduced, thereby improving the user experience.

Figure 17:
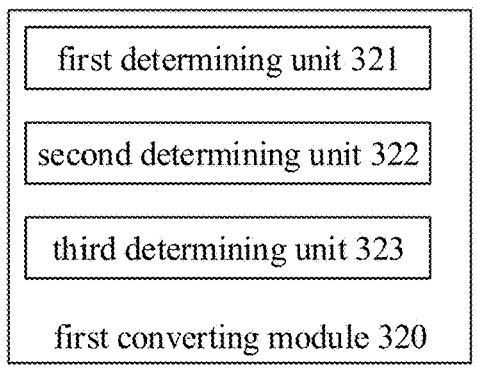
FIG. 17 is a block diagram of a first converting module according to an embodiment of the present disclosure.

Referring to FIG. 17, in some implementations, the first converting module 320 includes a first determining unit 321, a second determining unit 322 and a third determining unit 323. The first determining unit 3302 is configured to determine whether a color of a first simulation pixel is identical to that of an original pixel at a same position as the first simulation pixel. The second determining unit 332 is configured to determine a pixel value of the original pixel as a pixel value of the first simulation pixel, when the color of the first simulation pixel is identical to that of the original pixel at the same position as the first simulation pixel. The third determining unit 333 is configured to determine the pixel value of the first simulation pixel according to a pixel value of an association pixel when the color of the first simulation pixel is different from that of the original pixel at the same position as the first simulation pixel, in which the association pixel is selected from an image pixel unit with a same color as the first simulation pixel and adjacent to an image pixel unit including the original pixel. In other words, the act at block 21 can be implemented by the first determining unit 321. The act at block 22 can be implemented by the first processing unit 322. The act at block 23 can be implemented by the second processing unit 323.

Figure 18:
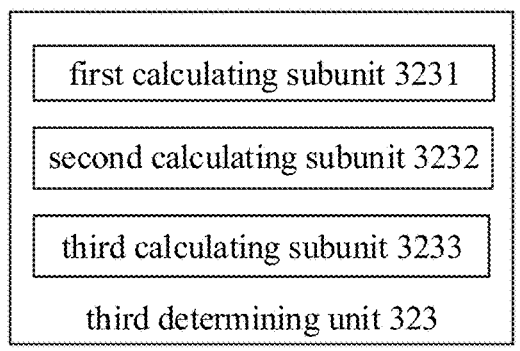
FIG. 18 is a block diagram of a third determining unit according to an embodiment of the present disclosure.

Referring to FIG. 18, the third determining unit 323 includes a first calculating sub-unit 3231, a second calculating sub-unit 3232 and a third calculating sub-unit 3233. The first calculating sub-unit 3231 is configured to calculate a change of the color of the first simulation pixel in each direction of at least two directions according to the pixel value of the association pixel. The second calculating sub-unit 3232 is configured to calculate a weight in each direction of the at least two directions according to the change. The third calculating sub-unit 3233 is configured to calculate the pixel value of the first simulation pixel according to the weight and the pixel value of the association pixel. In other words, the act at block 231 can be implemented by the first calculating sub-unit 3231. The act at block 232 can be implemented by the second calculating sub-unit 3232. The act at block 233 can be implemented by the third calculating sub-unit 3233.

Figure 19:
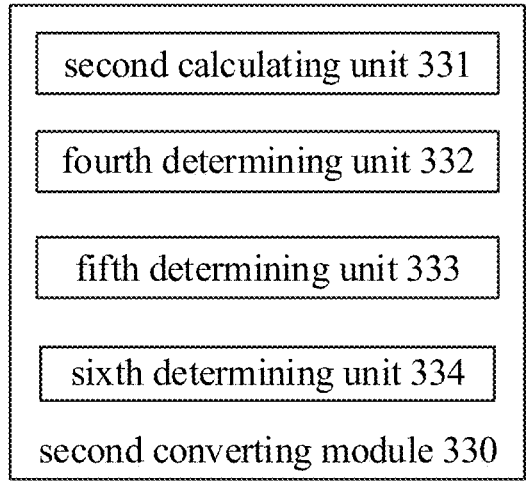
FIG. 19 is a block diagram of a second converting module according to an embodiment of the present disclosure.

Referring to FIG. 19, in some implementations, the second converting module 330 includes a first calculating unit 331, a fourth determining unit 332, a fifth determining unit 333 and a sixth determining unit 334. The act at block 31 can be implemented by the first calculating unit 331. The act at block 32 can be implemented by the fourth determining unit 332. The act at block 33 can be implemented by the fifth determining unit 333. The act at block 34 can be implemented by the sixth determining unit 334. In other words, the first calculating unit 331 is configured to calculate an average pixel value of each image pixel unit of the part of the color-block image within the face region. The fourth determining unit 332 is configured to determine whether a color of a second simulation pixel is identical to that of an original pixel at a same position as the second simulation pixel. The fifth determining unit 333 is configured to determine an average pixel value of an image pixel unit including the original pixel as a pixel value of the second simulation pixel, when the color of the second simulation pixel is identical to that of the original pixel at the same position as the second simulation pixel. The sixth determining unit 334 is configured to determine an average pixel value of an image pixel unit with a same color as the second simulation pixel and adjacent to an image pixel unit including the original pixel as a pixel value of the second simulation pixel, when the color of the second simulation pixel is different from that of the original pixel at the same position as the second simulation pixel.

Figure 20:
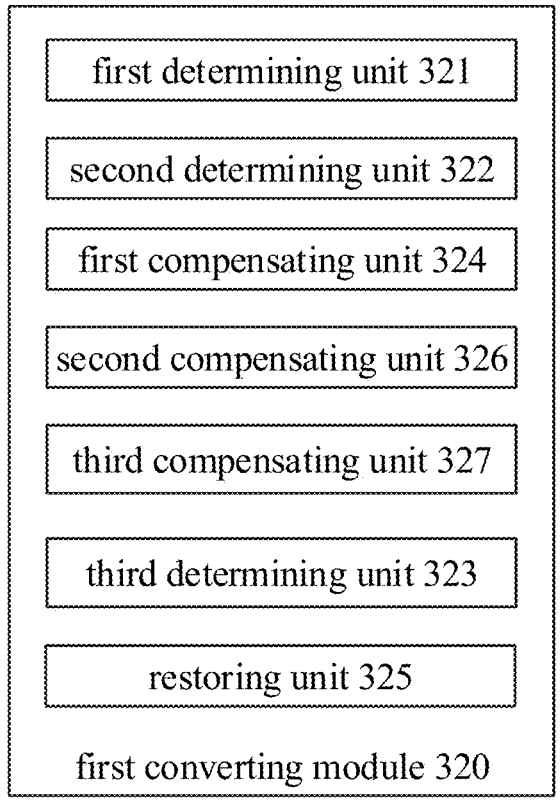
FIG. 20 is a block diagram of a first converting module according to an embodiment of the present disclosure.

Referring to FIG. 20, in some implementations, the first converting module 320 further includes a first compensating unit 324 and a restoring unit 325. The act at block 24 can be implemented by the first compensating unit 324. The act at block 25 can be implemented by the restoring unit 325. In other words, the first compensating unit 324 is configured to perform a white-balance compensation on the color-block image. The restoring unit 325 is configured to perform a reverse white-balance compensation on the first simulation image.

Referring to FIG. 20 again, in some implementations, the first converting module 320 further includes a second compensating unit 326. The act at block 26 can be implemented by the second compensating unit 326. In other words, the second compensating unit 326 is configured to perform a bad-point compensation on the color-block image.

In some implementations, the first converting module 320 further includes a third compensating unit 327. The act at block 27 can be implemented by the third compensating unit 327. In other words, the third compensating unit 327 is configured to perform a crosstalk compensation on the color-block image.

Figure 21:
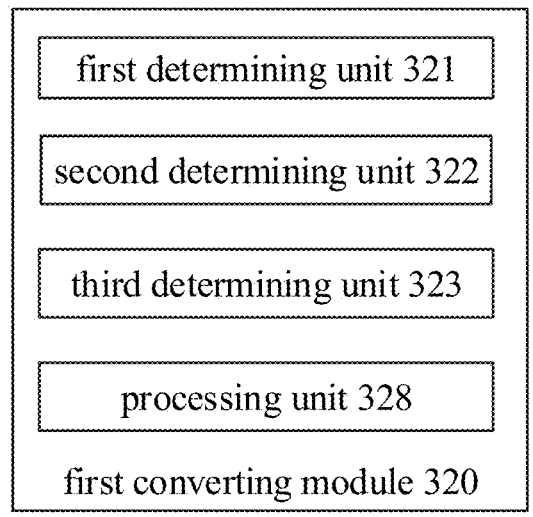
FIG. 21 is a block diagram of a first converting module according to an embodiment of the present disclosure.

Referring to FIG. 21, in some implementations, the first converting module 320 further includes a processing unit 328. The act at block 28 can be implemented by the processing unit 328. In other words, the processing unit 328 is configured to perform at least one of a mirror shape correction, a demosaicking processing, a denoising processing and an edge sharpening processing on the first simulation image.

The present disclosure also provides an electronic device.

Figure 22:
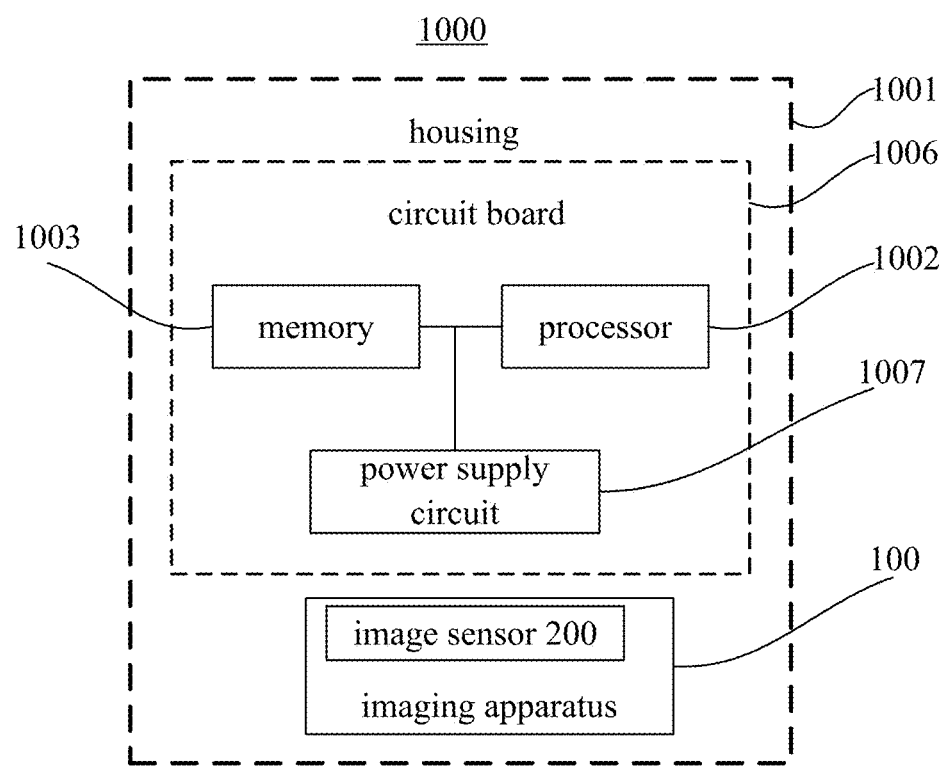
FIG. 22 is a block diagram of an electronic device according to an embodiment of the present disclosure.

FIG. 22 is a block diagram of an electronic device 1000 according to an embodiment of the present disclosure. Referring to FIG. 22, the electronic device 1000 of the present disclosure includes a housing 1001, a processor 1002, a memory 1003, a circuit board 1006, a power supply circuit 1007 and an imaging apparatus 100. The circuit board 1006 is enclosed by the housing 1001. The processor 1002 and the memory 1003 are positioned on the circuit board 1006. The power supply circuit 1007 is configured to provide power for respective circuits or components of the electronic device 1000. The memory 1003 is configured to store executable program codes. The imaging apparatus 100 includes an image sensor 200. As illustrated above, the image sensor 200 includes an array 210 of photosensitive pixel units and an array 220 of filter units arranged on the array 210 of photosensitive pixel units. Each filter unit 220a corresponds to one photosensitive pixel unit 210a, and each photosensitive pixel unit 210a includes a plurality of photosensitive pixels 212. The color-block image includes image pixel units arranged in a preset array. Each image pixel unit includes a plurality of original pixels. Each photosensitive pixel unit 210a corresponds to one image pixel unit, and each photosensitive pixel 212 corresponds to one original pixel.

The processor 1002 is configured to run a program corresponding to the executable program codes by reading the executable program codes stored in the memory 1003, to perform following operations: identifying a face region of the color-block image; converting a part of the color-block image beyond the face region into a first simulation image using a first interpolation algorithm, in which, the first simulation image includes first simulation pixels arranged in a preset array, and each photosensitive pixel corresponds to one first simulation pixel; converting a part of the color-block image within the face region into a second simulation image using a second interpolation algorithm, in which, the second simulation image includes second simulation pixels arranged in a preset array, and each photosensitive pixel corresponds to one second simulation pixel, and a complexity of the second interpolation algorithm is less than that of the first interpolation algorithm; and merging the first simulation image and the second simulation image into a simulation image corresponding to the color-block image.

In some implementations, the electronic device 1000 is a phone or a tablet computer.

The phone and the tablet computer have a camera (i.e. an imaging apparatus 100), such that when the phone or the tablet computer is used, an image with a high distinguishability may be obtained by adopting the image processing method according to embodiments of the present disclosure.

Certainly, the electronic device 1000 may further be another electronic device having an imaging capability.

In some implementations, the electronic device 1000 includes a front camera or a rear camera.

It may be understood, varieties of electronic device 1000 include both the front camera and a rear camera. The image captured by the front camera or the rear camera may be processed by adopting the image processing method according to embodiments of the present disclosure, thus improving the user's experience.

In some implementations, the processor 1002 is configured to run a program corresponding to the executable program codes by reading the executable program codes stored in the memory 1003, to perform determining whether a color of a first simulation pixel is identical to that of an original pixel at a same position as the first simulation pixel; when the color of the first simulation pixel is identical to that of the original pixel at the same position as the first simulation pixel, determining a pixel value of the original pixel as a pixel value of the first simulation pixel; and when the color of the first simulation pixel is different from that of the original pixel at the same position as the first simulation pixel, determining the pixel value of the first simulation pixel according to a pixel value of an association pixel, in which the association pixel is selected from an image pixel unit with a same color as the first simulation pixel and adjacent to an image pixel unit including the original pixel.

In some implementations, the processor 1002 is configured to run a program corresponding to the executable program codes by reading the executable program codes stored in the memory 1003, to perform calculating a change of the color of the first simulation pixel in each direction of at least two directions according to the pixel value of the association pixel; calculating a weight in each direction of the at least two directions according to the change; and calculating the pixel value of the first simulation pixel according to the weight and the pixel value of the association pixel.

In some implementations, the processor 1002 is configured to run a program corresponding to the executable program codes by reading the executable program codes stored in the memory 1003, to perform calculating an average pixel value of each image pixel unit of the part of the color-block image within the face region; determining whether a color of a second simulation pixel is identical to that of an original pixel at a same position as the second simulation pixel; when the color of the second simulation pixel is identical to that of the original pixel at the same position as the second simulation pixel, determining an average pixel value of an image pixel unit including the original pixel as a pixel value of the second simulation pixel; and when the color of the second simulation pixel is different from that of the original pixel at the same position as the second simulation pixel, determining an average pixel value of an image pixel unit with a same color as the second simulation pixel and adjacent to an image pixel unit including the original pixel as a pixel value of the second simulation pixel.

In some implementations, the processor 1002 is configured to run a program corresponding to the executable program codes by reading the executable program codes stored in the memory 1003, to perform following operations: performing a white-balance compensation on the color-block image; and performing a reverse white-balance compensation on the first simulation image.

In some implementations, the processor 1002 is configured to run a program corresponding to the executable program codes by reading the executable program codes stored in the memory 1003, to perform following operation: performing at least one of a bad-point compensation and a crosstalk compensation on the color-block image.

In some implementations, the processor 1002 is configured to run a program corresponding to the executable program codes by reading the executable program codes stored in the memory 1003, to perform following operations: performing at least one of a mirror shape correction, a demosaicking processing, a denoising processing and an edge sharpening processing on the first simulation image.

In some implementations, the electronic device may be an electronic equipment provided with an imaging apparatus, such as a mobile phone or a tablet computer, which is not limited herein.

The electronic device 1000 may further include an inputting component (not illustrated in FIG. 22). It should be understood that, the inputting component may further include one or more of the following: an inputting interface, a physical button of the electronic device 1000, a microphone, etc.

It should be understood that, the electronic device 1000 may further include one or more of the following components (not illustrated in FIG. 22): an audio component, an input/output (I/O) interface, a sensor component and a communication component. The audio component is configured to output and/or input audio signals, for example, the audio component includes a microphone. The I/O interface is configured to provide an interface between the processor 1002 and peripheral interface modules. The sensor component includes one or more sensors to provide status assessments of various aspects of the electronic device 1000. The communication component is configured to facilitate communication, wired or wirelessly, between the electronic device 1000 and other devices.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. Moreover, those skilled in the art could combine different embodiments or different characteristics in embodiments or examples described in the present disclosure.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. An image processing method, configured to process a color-block image output by an image sensor to output a simulation image, wherein the image sensor comprises an array of photosensitive pixel units and an array of filter units arranged on the array of photosensitive pixel units, each filter unit corresponds to one photosensitive pixel unit, each photosensitive pixel unit comprises a plurality of photosensitive pixels, the color-block image comprises image pixel units arranged in a preset array, each image pixel unit comprises a plurality of original pixels, each photosensitive pixel corresponds to one original pixel, and the image processing method comprises:

identifying a face region of the color-block image;
converting the color-block image into the simulation image, wherein the simulation image comprises simulation pixels arranged in a preset array, the simulation pixel comprises a current pixel, the original pixel comprises an association pixel corresponding to a position of the current pixel, the converting the color-block image into the simulation image comprises:
determining whether the association pixel is beyond the face region;
when the association pixel is beyond the face region, determining whether a color of the current pixel is identical to that of the association pixel;
when the color of the current pixel is identical to that of the association pixel, determining a pixel value of the association pixel as a pixel value of the current pixel;
when the color of the current pixel is different from that of the association pixel, determining a pixel value of the current pixel according to a pixel value of an association pixel unit using a first interpolation algorithm, the image pixel unit comprises the association pixel unit, a color of the association pixel unit is the same with that of the current pixel and adjacent to the association pixel;

when the association pixel is within the face region, calculating a pixel value of the current pixel using a second interpolation algorithm, wherein, a complexity of the second interpolation algorithm is less than that of the first interpolation algorithm.

2. The image processing method according to claim 1, wherein the preset array comprises a Bayer array.

3. The image processing method according to claim 1, wherein the image pixel unit comprises original pixels arranged in a 2-by-2 array.

4. The image processing method according to claim 1, wherein the determining the pixel value of the current pixel according to the pixel value of the association pixel unit using the first interpolation algorithm, comprises:

calculating a change of the color of the association pixel in each direction of at least two directions;

calculating a weight of the association pixel in each direction of the at least two directions; and calculating the pixel value of the current pixel according to the weight and the change.

5. The image processing method according to claim 1,
wherein, before the determining the pixel value of the current pixel according to the pixel value of the association pixel unit using the first interpolation algorithm, the method further comprises: performing a white-balance compensation on the color-block image;

wherein, after the determining the pixel value of the current pixel according to the pixel value of the association pixel unit using the first interpolation algorithm, the method further comprises: performing a reverse white-balance compensation on the simulation image.

6. The image processing method according to claim 1, wherein, before the determining the pixel value of the current pixel according to the pixel value of the association pixel unit using the first interpolation algorithm, the method further comprises: performing a bad-point compensation on the color-block image.

7. The image processing method according to claim 1, wherein, before the determining the pixel value of the current pixel according to the pixel value of the association pixel unit using the first interpolation algorithm, the method further comprises: performing a crosstalk compensation on the color-block image.

8. The image processing method according to claim 1, wherein, after the determining the pixel value of the current pixel according to the pixel value of the association pixel unit using the first interpolation algorithm, the method further comprises:

performing a mirror shape correction, a demosaicking processing, a denoising processing and an edge sharpening processing on the simulation image.

9. An image processing apparatus, configured to process a color-block image output by an image sensor to output a simulation image, wherein the image sensor comprises an array of photosensitive pixel units and an array of filter units arranged on the array of photosensitive pixel units, each filter unit corresponds to one photosensitive pixel unit, and each photosensitive pixel unit comprises a plurality of photosensitive pixels, the color-block image comprises image pixel units arranged in a preset array, each image pixel unit comprises a plurality of original pixels, each photosensitive pixel corresponds to one original pixel; the image processing apparatus comprises: a non-transitory computer-readable medium comprising computer-executable instructions stored thereon, and an instruction execution system which is configured by the instructions to implement:

an identifying module, configured to identify a face region of the color-block image; and a converting module, configured to convert the color-block image into the simulation image, wherein the simulation image comprises simulation pixels arranged in a preset array, the simulation pixel comprises a current pixel, the original pixel comprises an association pixel corresponding to a position of the current simulation pixel;

the converting module comprising:

a first determining unit, configured to determine whether the association pixel is beyond the face region;

a second determining unit, configured to, when the association pixel is beyond the face region, determine whether a color of the current pixel is identical to that of the association pixel;

a first calculating unit, configured to, when the color of the current pixel is identical to that of the association pixel, determine a pixel value of the association pixel as a pixel value of the current pixel;

a second calculating unit, configured to, when the color of the current pixel is different from that of the association pixel, determine a pixel value of the current pixel according to a pixel value of an association pixel unit using a first interpolation algorithm, the image pixel unit comprises the association pixel unit, a color of the association pixel unit is the same with that of the current pixel and adjacent to the association pixel; and a third calculating unit, configured to, when the association pixel is within the face region, calculate a pixel value of the current pixel using a second interpolation algorithm, wherein, a complexity of the second interpolation algorithm is less than that of the first interpolation algorithm.

10. The image processing apparatus according to claim 9, wherein the preset array comprises a Bayer array.

11. The image processing apparatus according to claim 9, wherein the image pixel unit comprises original pixels arranged in a 2-by-2 array.

12. The image processing apparatus according to claim 9, wherein the second calculating unit comprises:

a first calculating sub unit, configured to calculate a change of the color of the association pixel in each direction of at least two directions;

a second calculating sub unit, configured to calculate a weight of the association pixel in each direction of the at least two directions; and a third calculating sub unit, configured to calculate the pixel value of the current pixel according to the weight and the change.

13. The image processing apparatus according to claim 9, wherein the converting module comprises:

a white-balance compensation unit, configured to perform a white-balance compensation on the color-block image;

a reverse white-balance compensation unit, configured to perform a reverse white-balance compensation on the simulation image.

14. The image processing apparatus according to claim 9, wherein the converting module comprises:

a bad-point compensation unit, configured to perform a bad-point compensation on the color-block image.

15. The image processing apparatus according to claim 9, wherein the converting module comprises:
a crosstalk compensation unit, configured to perform a crosstalk compensation on the color-block image.

16. The image processing apparatus according to claim 9, wherein the converting module comprises:
a processing unit, configured to perform a mirror shape correction, a demosaicking processing, a denoising processing and an edge sharpening processing on the simulation image.

17. An electronic device, comprising:
an imaging device comprising an image processing apparatus and an image sensor configured to output a color-block image; and
a touch screen,
wherein
the image sensor comprises an array of photosensitive pixel units and an array of filter units arranged on the array of photosensitive pixel units, each filter unit corresponds to one photosensitive pixel unit, and each photosensitive pixel unit comprises a plurality of photosensitive pixels, the color-block image comprises image pixel units arranged in a preset array, each image pixel unit comprises a plurality of original pixels, each photosensitive pixel corresponds to one original pixel;
the image processing apparatus comprises: a non-transitory computer-readable medium comprising computer-executable instructions stored thereon, and an instruction execution system which is configured by the instructions to implement:
an identifying module, configured to identify a face region of the color-block image; and
a converting module, configured to convert the color-block image into the simulation image, wherein the simulation image comprises simulation pixels arranged in a preset array, the simulation pixel comprises a current pixel, the original pixel comprises an association pixel corresponding to a position of the current simulation pixel;
the converting module comprising:
a first determining unit, configured to determine whether the association pixel is beyond the face region;
a second determining unit, configured to, when the association pixel is beyond the face region, determine whether a color of the current pixel is identical to that of the association pixel;
a first calculating unit, configured to, when the color of the current pixel is identical to that of the association pixel, determine a pixel value of the association pixel as a pixel value of the current pixel;
a second calculating unit, configured to, when the color of the current pixel is different from that of the association pixel, determine a pixel value of the current pixel according to a pixel value of an association pixel unit using a first interpolation algorithm, the image pixel unit comprises the association pixel unit, a color of the association pixel unit is the same with that of the current pixel and adjacent to the association pixel; and
a third calculating unit, configured to, when the association pixel is within the face region, calculate a pixel value of the current pixel using a second interpolation algorithm, wherein, a complexity of the second interpolation algorithm is less than that of the first interpolation algorithm.

18. The electronic device according to claim 17, wherein the second calculating unit comprises:
a first calculating sub unit, configured to calculate a change of the color of the association pixel in each direction of at least two directions;
a second calculating sub unit, configured to calculate a weight of the association pixel in each direction of the at least two directions; and
a third calculating sub unit, configured to calculate the pixel value of the current pixel according to the weight and the change.

19. The electronic device according to claim 17, wherein the electronic device comprises a mobile phone or a tablet.

20. The electronic device according to claim 17, wherein the imaging device comprises a front camera or a rear camera.

* * * * *